(12) United States Patent
Gong et al.

(10) Patent No.: US 11,531,422 B2
(45) Date of Patent: Dec. 20, 2022

(54) TOUCH DISPLAY PANEL, METHOD FOR DRIVING TOUCH DISPLAY PANEL, AND DISPLAY DEVICE

(71) Applicant: Wuhan Tianma Micro-Electronics Co., Ltd., Wuhan (CN)

(72) Inventors: Houfu Gong, Wuhan (CN); Miao Chen, Wuhan (CN); Chuan Liu, Wuhan (CN); Jun Li, Wuhan (CN); Zhihua Yu, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 17/406,149

(22) Filed: Aug. 19, 2021

(65) Prior Publication Data

US 2021/0382599 A1 Dec. 9, 2021

(30) Foreign Application Priority Data

May 6, 2021 (CN) .......................... 202110492190.3

(51) Int. Cl.
*G06F 3/041* (2006.01)
*G06F 3/044* (2006.01)
*G09G 3/20* (2006.01)

(52) U.S. Cl.
CPC ........ *G06F 3/04166* (2019.05); *G06F 3/0412* (2013.01); *G06F 3/0446* (2019.05);
(Continued)

(58) Field of Classification Search
CPC .............. G06F 3/04166; G06F 3/0412; G06F 3/04164; G06F 3/0446; G06F 3/0443;
(Continued)

(56) References Cited

U.S. PATENT DOCUMENTS

| 8,970,545 B2* | 3/2015 | Reynolds ................ G06F 3/047 345/174 |
| 8,970,546 B2* | 3/2015 | Schwartz ............ G06F 3/04184 345/173 |

(Continued)

FOREIGN PATENT DOCUMENTS

| CN | 104731402 A | 6/2015 |
| CN | 106933405 A | 7/2017 |

*Primary Examiner* — Benyam Ketema
(74) *Attorney, Agent, or Firm* — KDB Firm PLLC

(57) ABSTRACT

Disclosed are touch display panel, method for driving touch display panel, and display device. The touch display panel includes display region including plurality of touch driver electrodes and plurality of touch sensing electrodes both arranged in array, and non-display region surrounding display region and including touch auxiliary circuit and touch driver circuit. When refresh frequency is first frequency, touch driver circuit configured to provide touch drive signal for each touch driver electrode in touch stage, and receive touch sensing signal returned by each touch sensing electrode to determine touch position according to touch sensing signal. When refresh frequency is the first frequency, touch auxiliary circuit configured to provide first voltage signal for each touch driver electrode in touch stage; and voltage of first voltage signal greater than voltage of touch drive signal. The present disclosure can increase report rate, and satisfy touch and display requirements for high refresh frequency.

20 Claims, 17 Drawing Sheets

(52) U.S. Cl.
CPC ........... *G06F 3/04164* (2019.05); *G09G 3/20* (2013.01); *G06F 3/0443* (2019.05); *G09G 2300/08* (2013.01); *G09G 2330/021* (2013.01)

(58) Field of Classification Search
CPC .... G06F 3/0445; G09G 3/20; G09G 2300/08; G09G 2330/021; G09G 2320/0247
See application file for complete search history.

(56) References Cited

U.S. PATENT DOCUMENTS

| | | | | |
|---|---|---|---|---|
| 10,073,550 | B2* | 9/2018 | Shepelev | G06F 3/0446 |
| 10,275,070 | B2* | 4/2019 | Fu | G06F 3/04166 |
| 10,520,978 | B1* | 12/2019 | Li | G06F 1/1683 |
| 11,079,878 | B1* | 8/2021 | Krah | H03H 7/06 |
| 11,287,926 | B1* | 3/2022 | Shahsavari | G06K 9/6256 |
| 2008/0062140 | A1* | 3/2008 | Hotelling | G02F 1/13338 345/173 |
| 2008/0062148 | A1* | 3/2008 | Hotelling | G02F 1/13338 455/566 |
| 2011/0187677 | A1* | 8/2011 | Hotelling | G06F 3/0443 345/174 |
| 2012/0268423 | A1* | 10/2012 | Hotelling | G06F 3/04184 345/173 |
| 2013/0037330 | A1* | 2/2013 | Singh | G06F 3/04164 178/18.06 |
| 2013/0038378 | A1* | 2/2013 | Singh | G06F 3/0446 327/517 |
| 2014/0092051 | A1* | 4/2014 | Weinerth | G06F 3/0443 345/174 |
| 2015/0084911 | A1* | 3/2015 | Stronks | G09G 3/20 345/174 |
| 2016/0370915 | A1* | 12/2016 | Agarwal | G06F 3/0443 |
| 2017/0090624 | A1* | 3/2017 | Kwon | G06F 1/3262 |
| 2017/0123552 | A1* | 5/2017 | Brunet | G06F 3/04184 |
| 2017/0153763 | A1* | 6/2017 | Vavra | G06F 3/0442 |
| 2017/0293372 | A1* | 10/2017 | Gum | G06F 3/0446 |
| 2018/0024677 | A1* | 1/2018 | Kim | G06F 3/0412 345/173 |
| 2019/0064962 | A1* | 2/2019 | Bye | G06F 3/041662 |
| 2020/0103993 | A1* | 4/2020 | Krah | G06F 3/04182 |
| 2021/0303152 | A1* | 9/2021 | Hosur | G06F 3/0418 |

* cited by examiner

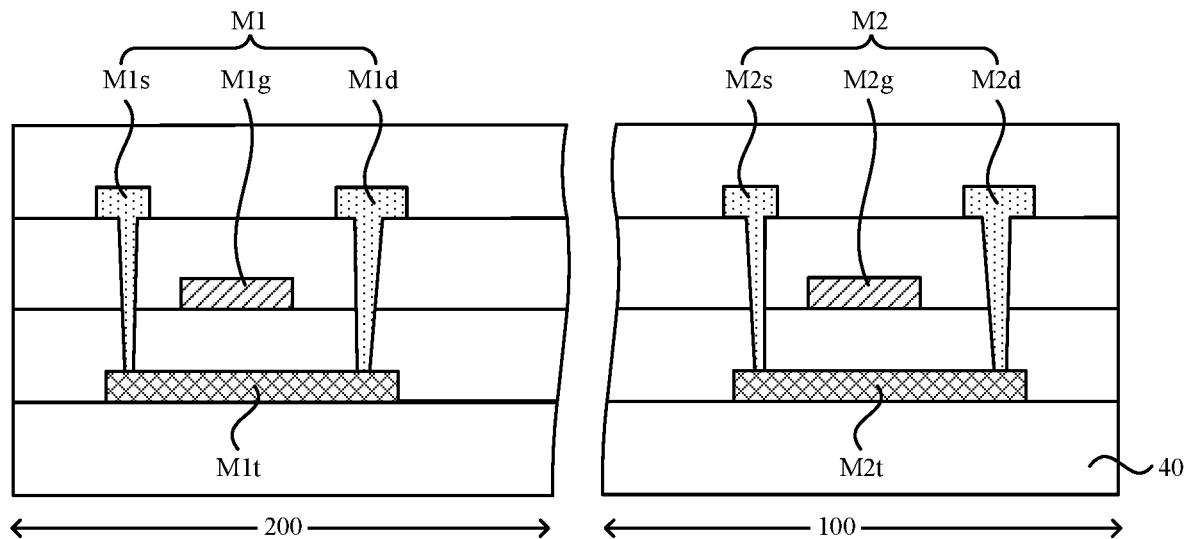

FIG. 18

In a touch stage in which a refresh frequency is a first frequency, providing a touch drive signal and a first voltage signal for each touch driver electrode column, and receiving a touch sensing signal returned by each touch sensing electrode respectively; where a voltage of the first voltage signal is greater than a voltage of the touch drive signal ∿S110

Determining a touch position according to the touch sensing signal returned by the each touch sensing electrode ∿S120

FIG. 19

TOUCH DISPLAY PANEL, METHOD FOR DRIVING TOUCH DISPLAY PANEL, AND DISPLAY DEVICE

CROSS-REFERENCE TO RELATED APPLICATION(S)

This application claims priority to Chinese Patent Application No. 202110492190.3 filed May 6, 2021, titled "TOUCH DISPLAY PANEL, METHOD FOR DRIVING TOUCH DISPLAY PANEL, AND DISPLAY DEVICE", the disclosure of which is incorporated herein by reference in its entirety.

TECHNICAL FIELD

The present disclosure relates to the field of display technologies, and in particular, to a touch display panel, a method for driving a touch display panel, and a display device.

BACKGROUND

A touch operation is a simple and convenient man-machine interaction manner, and a display panel is integrated with a touch function in more and more products. When a touch object (such as a finger, a touch pen) is in contact with a touch display panel, a touch electrode in the touch display panel may detect a touch position of the touch object, and drive a touch display device according to an input instruction, so as to achieve a specific display. In an existing art of touch display, since an amplitude of a drive voltage is limited and a charging speed of a capacitor is relatively slow, whereby a charging time of the capacitor is relatively long, and further a report rate of the touch display panel is relatively low.

SUMMARY

Embodiments of the present disclosure provide a touch display panel, a method for driving a touch display panel, and a display device, which can improve a charging speed of a capacitor, reduce a charging time of the capacitor, and thus improve a report rate.

In a first aspect, an embodiment of the present disclosure provides a touch display panel. The touch display panel includes a display region and a non-display region surrounding the display region. The display region includes a plurality of touch driver electrodes arranged in array and a plurality of touch sensing electrodes arranged in array. The non-display region includes a touch auxiliary circuit and a touch driver circuit. When a refresh frequency is a first frequency, the touch driver circuit is configured to provide a touch drive signal for each touch driver electrode of the plurality of touch driver electrodes in a touch stage, and receive a touch sensing signal returned by each touch sensing electrode of the plurality of touch sensing electrodes so as to determine a touch position according to the touch sensing signal returned by the each touch sensing electrode. When the refresh frequency is the first frequency, the touch auxiliary circuit is configured to provide a first voltage signal for each touch driver electrode of the plurality of touch driver electrodes in the touch stage. A voltage of the first voltage signal is greater than a voltage of the touch drive signal.

In a second aspect, an embodiment of the present disclosure provides a method for driving a touch display panel. The method includes in a touch stage in which a refresh frequency is a first frequency, a touch drive signal and a first voltage signal are provided for each touch driver electrode column, and a touch sensing signal returned by each touch sensing electrode is received, respectively; where a voltage of the first voltage signal is greater than a voltage of the touch drive signal; and a touch position is determined according to the touch sensing signal returned by the each touch sensing electrode.

In a third aspect, an embodiment of the present disclosure provides a display device including the touch display panel described in the first aspect.

The touch display panel provided in the embodiments of the present disclosure includes the display region and the non-display region surrounding the display region, the display region includes the touch driver electrodes arranged in array and the touch sensing electrodes arranged in array, and the non-display region includes the touch driver circuit and the touch auxiliary circuit. In the touch stage in which the refresh frequency is the first frequency, the touch driver circuit is configured to send the touch drive signal for each touch driver electrode, and the touch auxiliary circuit is configured to send the first voltage signal for each touch driver electrode, so as to charge a capacitor formed by the touch driver electrode and the touch sensing electrode, and determine the touch position according to the touch sensing signal when the touch driver circuit receives the touch sensing signal fed back by the touch sensing electrodes. Therefore, in the touch stage, a relatively large first voltage signal is provided to the touch driver electrodes besides providing a conventional touch drive signal to the touch driver electrodes, so that compared with a condition that the touch drive signal is only provided to the touch driver electrodes, electric signals provided to each touch driver electrode can be increased, and the charging requirements of the capacitor formed by the touch driver electrode and the touch sensing electrode can be satisfied in a relatively short time, the charging time of the touch driver electrodes and the touch sensing electrodes can be shortened, the report rate can be increased, and the display and touch requirements for a high refresh frequency may be satisfied.

BRIEF DESCRIPTION OF DRAWINGS

FIG. 18 is a schematic diagram of a film layer of a touch display panel provided in an embodiment of the present disclosure;

FIG. 19 is a schematic flowchart of a method for driving a touch display panel provided in an embodiment of the present disclosure.

DETAILED DESCRIPTION

Figure 1:
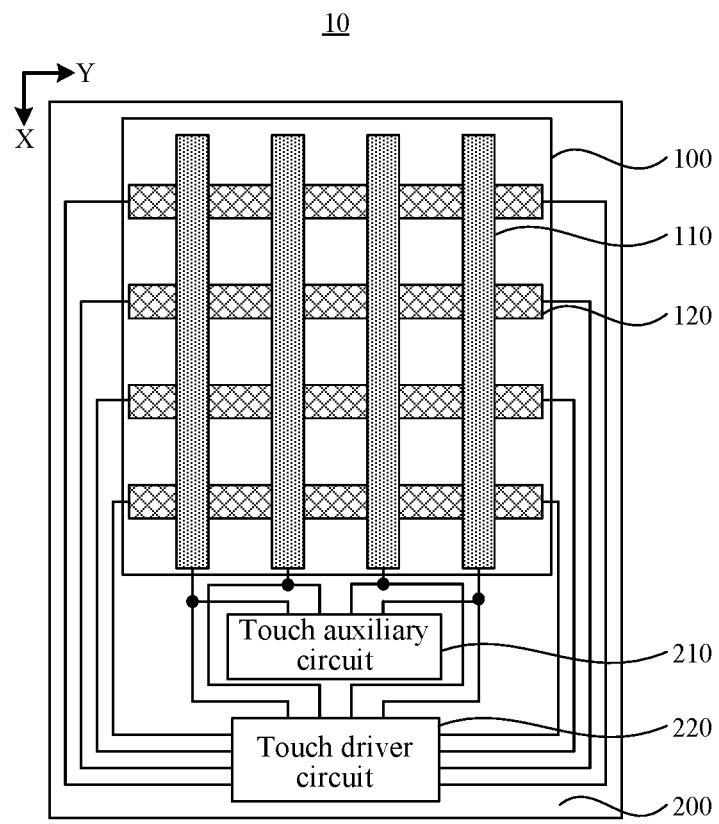
FIG. 1 is a schematic structural diagram of a touch display panel provided in an embodiment of the present disclosure.

The present disclosure will be further described in detail in conjunction with the drawings and embodiments below. It should be understood that the specific embodiments described herein are merely used for explaining the present disclosure and are not intended to limit the present disclosure. In addition, it should also be noted that, for ease of description, only some, but not all, of the structures related to the present disclosure are shown in the drawings.

As described in the background art, a mutual capacitive touch panel is usually provided with a touch driver electrode and a touch sensing electrode, and a capacitor formed by the touch driver electrode and the touch sensing electrode is charged by providing a touch drive signal to the touch driver electrode, and a touch position of a touch object (a finger and a touch pen) is determined through a touch detection signal fed back by the touch sensing electrode. However, in the related art, a voltage amplitude of the touch drive signal provided for the touch driver electrode is limited, if a charging electric quantity required by the capacitor formed by the touch driver electrode and the touch sensing electrode needs to be reached, then a long charging time is needed, and thus a report rate is relatively low; therefore, the display requirement of a touch display panel with a high display refresh frequency cannot be satisfied.

In view of the above-described technical problems, an embodiment of the present disclosure provides a touch display panel, a method for driving a touch display panel, and a display device. The touch display panel includes a display region and a non-display region surrounding the display region. The display region includes a plurality of touch driver electrodes arranged in array and a plurality of touch sensing electrodes arranged in array. The non-display region includes a touch auxiliary circuit and a touch driver circuit. When a refresh frequency is a first frequency, the touch driver circuit is configured to provide a touch drive signal for each touch driver electrode in a touch stage, and receive a touch sensing signal returned by each touch sensing electrode, so as to determine a touch position according to the touch sensing signal returned by each touch sensing electrode. When the refresh frequency is the first frequency, the touch auxiliary circuit is configured to provide a first voltage signal for each touch driver electrode in the touch stage; and a voltage of the first voltage signal is greater than a voltage of the touch drive signal.

The touch display panel provided in the embodiments of the present disclosure includes the display region and the non-display region surrounding the display region, the display region includes the touch driver electrodes arranged in array and the touch sensing electrodes arranged in array, and the non-display region includes the touch driver circuit and the touch auxiliary circuit. In the touch stage in which the refresh frequency is the first frequency, the touch driver circuit is configured to send the touch drive signal for each touch driver electrode, and the touch auxiliary circuit is configured to send the first voltage signal for each touch driver electrode, so as to charge the capacitor formed by the touch driver electrode and the touch sensing electrode, and determine the touch position according to the touch sensing signal when the touch driver circuit receives the touch sensing signal fed back by the touch sensing electrodes. Therefore, in the touch stage, a relatively large first voltage signal is provided to the touch driver electrodes besides providing a conventional touch drive signal to the touch driver electrodes, so that compared with a condition that the touch drive signal is only provided to the touch driver electrodes, electric signals provided to each touch driver electrode can be increased, and the charging requirements of the capacitor formed by the touch driver electrode and the touch sensing electrode can be satisfied in a relatively short time, the charging time of the touch driver electrodes and the touch sensing electrodes can be shortened, the report rate can be increased, and the display and touch requirements for a high refresh frequency may be satisfied.

The above is the core idea of the present disclosure, and the technical schemes of the embodiments of the present disclosure will be described clearly and completely in connection with the accompanying drawings in the embodiments of the present disclosure below. All other embodiments obtained by those of ordinary skill in the art based on the embodiments of the present disclosure without requiring creative efforts shall all fall in the scope of protection of the present disclosure.

FIG. 1 is a schematic structural diagram of a touch display panel provided in an embodiment of the present disclosure. As shown in FIG. 1, the touch display panel 10 includes a display region 100 and a non-display region 200 surrounding the display region 100. The display region 100 includes a plurality of touch driver electrodes 110 arranged in array and a plurality of touch sensing electrodes 120 arranged in array. The non-display region 200 includes a touch driver circuit 220. When a refresh frequency is a first frequency, the touch driver circuit 220 is configured to provide a touch drive signal for each touch driver electrode 110 in a touch stage, and receive a touch sensing signal returned by each touch sensing electrode 120, so as to determine a touch position according to the touch sensing signal returned by the each touch sensing electrode 120; therefore, a mutual capacitive touch sensor formed by the touch driver electrode 110 and the touch sensing electrode 120 is disposed in the touch display panel 10, so that when a touch object touches a touch surface of the touch display panel 10, the touch position of the touch object may be detected, and thus the touch display panel 10 may be integrated with double functions of touch and display.

Specifically, in order to prevent a display signal of the touch display panel 10 for controlling a display unit (not shown in the drawings) thereof to display from affecting both the touch drive signal and a touch detection signal for determining the touch position, the touch stage and a display stage of the touch display panel 10 are generally performed separately, so that one frame of display image of the touch display panel 10 may include a plurality of touch stages and a plurality of display stages. The display signal may be provided to at least part of the plurality of display units in each display stage, and the touch drive signal may be provided to each of the touch driver electrodes 110 in each touch stage, and touch detection signals fed back by each touch sensing electrode 120 are received in each touch stage.

The refresh rate is a number of display image frames capable of being presented by the touch display panel 10 per second, that is, the higher the refresh rate is, the larger a number of frames of images capable of being displayed by the touch display panel 10 is, so that the flicker of the images displayed by the touch display panel 10 is the smaller, that is, the quality of the displayed pictures is the higher. When the refresh frequency is improved, the time for each frame of display image of the touch display panel needs to be relatively shortened, that is, the touch stage and the display stage of each frame of display image need to be synchronously shortened; in this case, in the touch stage, a capacitor formed by the touch driver electrode 110 and the touch sensing electrode 120 is charged only by adopting a conventional touch drive signal, and the display and touch requirements for a high refresh frequency cannot be satisfied.

Therefore, a touch auxiliary circuit 210 is also disposed in the non-display region 200 of the touch display panel 10. In the touch stage in which the refresh frequency is the first frequency, the touch auxiliary circuit 210 may provide a first voltage signal for each touch driver electrode 110, and a voltage of the first voltage signal is greater than a voltage of the touch drive signal, so that when the refresh frequency is the first frequency, a signal provided to each touch driver electrode 110 is a sum of the first voltage signal and the touch drive signal, so that the capacitor formed by the touch driver electrode 110 and the touch sensing electrode 120 may be quickly charged, and the charging time of the capacitor formed by the touch driver electrode 110 and the touch sensing electrode 120 is shortened; therefore, the time required by each touch stage is shortened, a report rate is improved, and the display requirement for the high refresh frequency is further satisfied. The first frequency may be a higher refresh frequency, for example, the first frequency includes, but is not limited to, 120 Hz.

Figure 2:
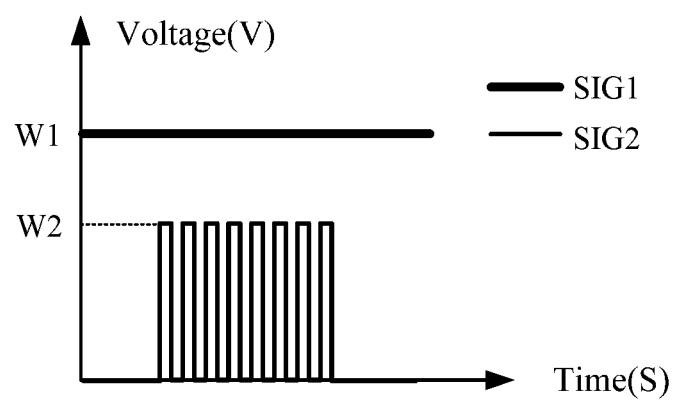
FIG. 2 is a timing diagram of a touch drive signal and a first voltage signal provided in an embodiment of the present disclosure.

Correspondingly, FIG. 2 is a timing diagram of a touch drive signal and a first voltage signal provided in an embodiment of the present disclosure. As shown with combined reference to FIGS. 1 and 2, in the touch stage in which the refresh frequency is the first frequency, the touch driver circuit 220 provides a touch drive signal SIG2 for each touch driver electrode 110 as a touch pulse signal, and a voltage W2 of the touch drive signal SIG2 refers to a maximum value of an amplitude of the touch pulse signal; the first voltage signal SIG1 may be a fixed voltage signal, that is, a voltage of the first voltage signal SIG1 is a fixed voltage W1, and the voltage W1 of the first voltage signal SIG1 is greater than the voltage of the touch drive signal SIG2, that is, $W1>W2$.

Therefore, according to the embodiments of the present disclosure, the touch auxiliary circuit 210 is additionally disposed in the non-display region 200, so that the touch auxiliary circuit 210 and the touch driver circuit 220 respectively provide the first voltage signal and the touch drive signal for the touch driver electrode 110 in the touch stage in which the refresh frequency is the first frequency, whereby electric signals received by the touch driver electrode 110 may be increased, and the time required for charging to the capacitance of the capacitor formed by the touch driver electrode 110 and the touch sensing electrode 120 may be shortened, a charging speed is improved, the time required for the touch stage may be shortened, the report rate of the touch display panel 10 is improved, and the display requirement for the high refresh frequency is satisfied.

It should be noted that the touch electrode in the touch display panel provided in the embodiments of the present disclosure is a mutual capacitive touch electrode, but a specific structure of the mutual capacitive touch electrode is not limited, and FIG. 1 is explained only by using an example in which the touch driver electrode and the touch sensing electrode of the mutual capacitive touch electrode are of strip-shaped; however, in the embodiments of the present disclosure, the touch driver electrode and the touch sensing electrode may be block-shaped.

Figure 3:
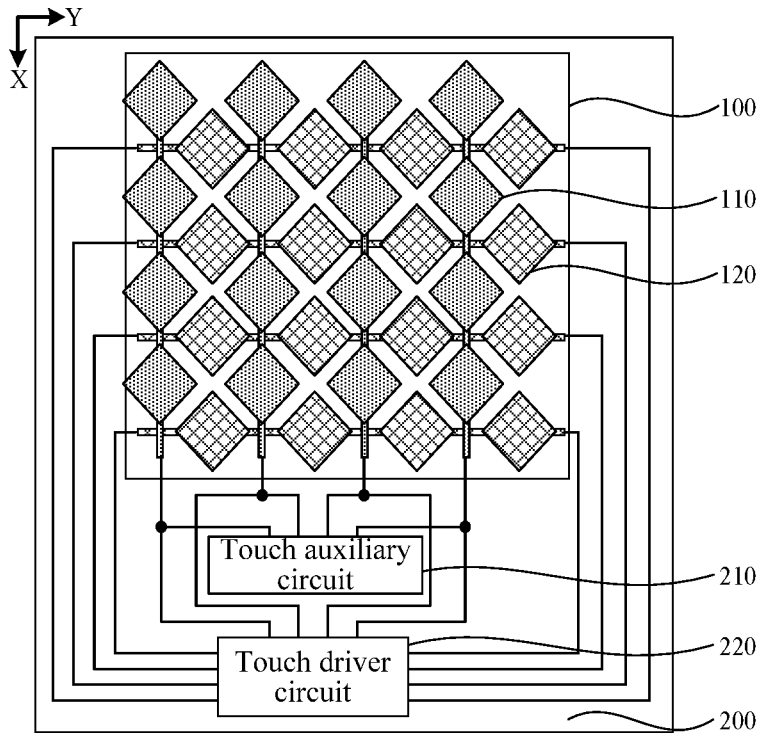
FIG. 3 is a schematic structural diagram of a touch display panel provided in another embodiment of the present disclosure.

In an exemplary embodiment, FIG. 3 is a schematic structural diagram of a touch display panel provided in another embodiment of the present disclosure. As shown in FIG. 3, the touch driver electrode 110 and the touch sensing electrode 120 of the touch display panel 10 are of a block-shaped structure, in this case, the touch driver electrode 110 and the touch sensing electrode 120 may be disposed on a same layer, the touch sensing electrodes 120 located in a same row may be connected to each other through a cross-bridge, and touch driver electrodes 110 located in a same column may be connected to one another through the cross-bridge. In this case, the capacitance is formed between the touch driver electrode 110 and the touch sensing electrode 120. Correspondingly, in a touch stage in which a touch refresh frequency of the touch display panel 10 is the first frequency, a touch drive signal is provided for each touch driver electrode 110 through the touch driver circuit 220, and a first voltage signal is provided for each touch driver electrode 110 through the touch auxiliary circuit 210, whereby the time for the capacitor formed by the touch driver electrode 110 and the touch sensing electrode 120 to reach the required charging electric quantity may be shortened, a touch report rate is improved, and the display requirement for a high refresh frequency is satisfied.

It should be understood that a manner in which the touch driver circuit 220 receives the touch sensing signal fed back by the touch sensing electrode 120 is not limited in the embodiments of the present disclosure, and only the touch driver circuit 220 is configured to receive the touch sensing signal returned by the touch sensing electrode 120 from both sides of the display region 100 shown in FIG. 1 and FIG. 3. In the embodiments of the present disclosure, other manners for receiving an induction signal may also be adopted.

Figure 4:
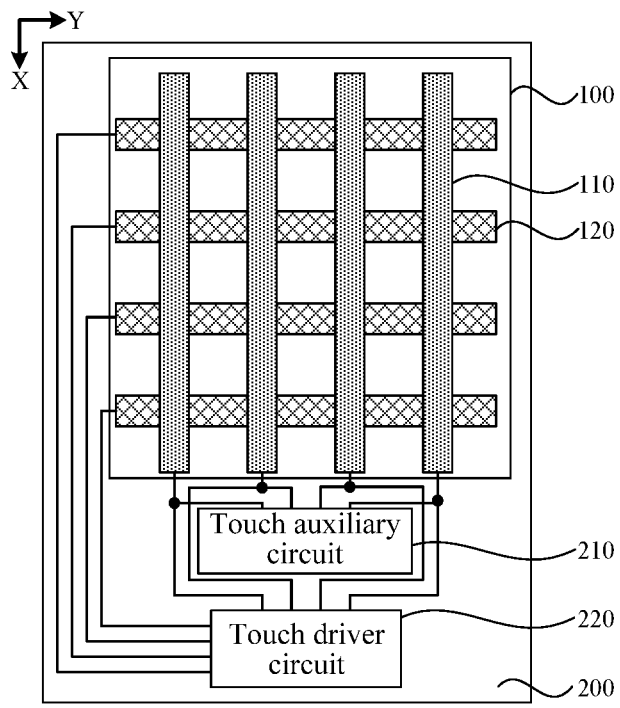
FIG. 4 is a schematic structural diagram of a touch display panel provided in another embodiment of the present disclosure.

In an exemplary embodiment, FIG. 4 is a schematic structural diagram of a touch display panel provided in another embodiment of the present disclosure, as shown in FIG. 4, the touch driver circuit 220 only receives a touch sensing signal returned by the touch sensing electrode 120 from one side of the display region 100; that is, the touch driver circuit 220 is electrically connected to the touch sensing electrodes 120 located in a same row from one side of the display region 100 through corresponding signal lines so as to receive touch detection signals fed back by the touch sensing electrodes 120 in each row.

For convenience of description, without explicit explanation, the technical schemes of the embodiments of the present disclosure are exemplarily explained in the embodiments of the present disclosure by taking the structure of the touch driver electrode 110 and the touch sensing electrode 120 of the touch display panel 10 shown in FIG. 1 as well as the setting manner of signal lines for connecting the touch driver electrode 110 and the touch sensing electrode 120 with the touch driver circuit 220 as an example.

It should be noted that when the first frequency is a relatively high refresh frequency, the relatively high refresh frequency may satisfy an application scene with higher display requirements, such as a scene of playing a competition game, a scene of watching a high-definition dynamic video and the like. In the embodiments of the present disclosure, the refresh frequency of the touch display panel is not limited to the first frequency, and may also be set according to different application scenes, so that the use requirements of different application scenes are satisfied. For example, the refresh frequency of the touch display panel may be specifically set as a second frequency, which may be lower than the first frequency, for example, when the first frequency is 120 Hz, the second frequency may be 90 Hz or 60 Hz, so that the use requirements of displaying a static picture or other application scenes without requirements for higher refresh frequency may be satisfied, and thus the power consumption of the touch display panel is reduced. Similarly, when the refresh frequency of the touch display panel is reduced, the time of each frame of image display is relatively prolonged, and in this case, the touch and display requirements of a current display refresh frequency may be satisfied without shortening the refresh frequency of the display stage and the touch stage in each display image frame.

In an embodiment, with continued reference to FIG. 1, when the refresh frequency is the second frequency, the touch driver circuit 220 is configured to provide a touch drive signal for each touch driver electrode 110 in the touch stage, and receive a touch sensing signal returned by each touch sensing electrode 120, so as to determine a touch position according to the touch sensing signal; when the refresh frequency is a second frequency, the touch auxiliary circuit 210 is configured to stop providing the first voltage signal for each touch driver electrode 110; and the first frequency is greater than the second frequency.

Specifically, when the refresh frequency of the touch display panel 10 is a second frequency lower than the first frequency, that is, the refresh frequency of the touch display panel 10 is a relatively low refresh frequency, the charging speed of the capacitor does not need to be increased, and the touch drive signal may be provided to the touch driver electrode 110 only through the touch driver circuit 220, so that the touch auxiliary circuit 210 does not need to provide a first voltage signal, and the charging requirement of the capacitor formed by the touch driver electrode 110 and the touch sensing electrode 120 may be satisfied; therefore, the power consumption of the touch display panel 10 may be relatively reduced, and thus the flexible use requirement of the touch display panel 10 is satisfied.

It should be noted that in the embodiments of the present disclosure, the specific structure of the touch driver electrode and the touch auxiliary circuit may be configured according to the function to be implemented, which is not specifically limited in the embodiments of the present disclosure. The technical schemes of the embodiments of the present disclosure are exemplarily described below with respect to a typical example of the touch auxiliary circuit.

Figure 5:
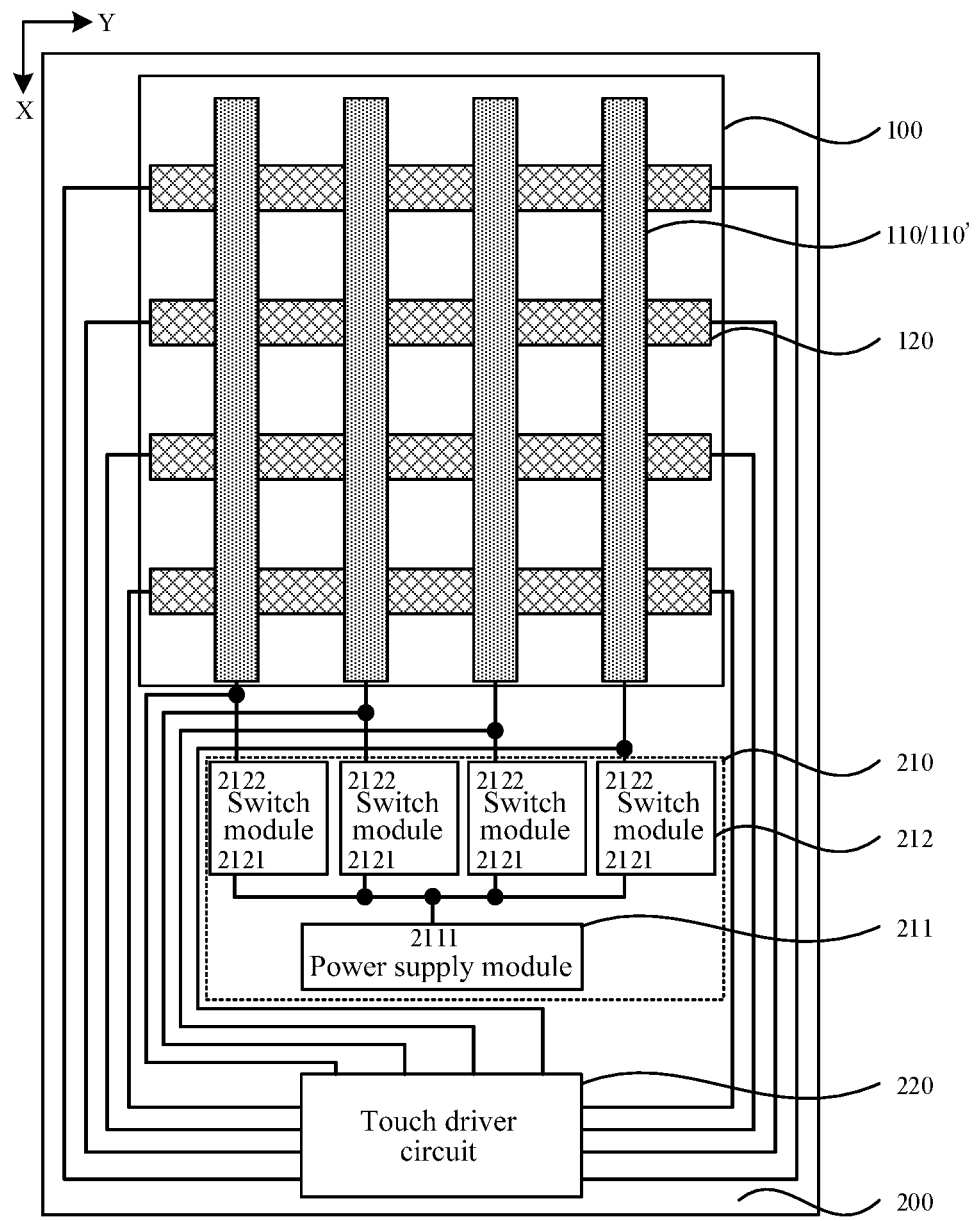
FIG. 5 is a schematic structural diagram of a touch display panel provided in another embodiment of the present disclosure.

In an embodiment, FIG. 5 is a schematic structural diagram of a touch display panel provided in another embodiment of the present disclosure, and as shown in FIG. 5, the touch auxiliary circuit 210 may include a power supply module 211 and a plurality of switch modules 212. A voltage signal output terminal 2111 of the power supply module 211 is electrically connected to an input terminal 2121 of each switch module 212; and the power supply module 211 is configured to provide the first voltage signal to the input terminal 2121 of the each switch module 212 in a touch stage in which the refresh frequency is the first frequency. The plurality of touch driver electrodes 110 arranged in array form a plurality of touch driver electrode columns 110', each touch driver electrode column 110' includes a plurality of touch driver electrodes 110 which are sequentially arranged in a first direction X; the plurality of switch modules 212 and the plurality of touch driver electrode columns 110' are disposed in an one-to-one correspondence manner, each touch driver electrode 110 belonging to a same touch driver electrode column 110' of the plurality of touch driver electrode columns is electrically connected to an output terminal 2122 of a same switch module 212, and the plurality of switch modules 212 are configured to transmit the first voltage signal to the touch driver electrodes 110 in the touch stage in which the refresh frequency is the first frequency.

Specifically, in the touch stage in which the refresh frequency of the touch display panel 10 is the first frequency, each switch module 212 is controlled to be turned on at different times, so that the touch driver circuit 220 may provide a touch drive signal to each touch driver electrode 110 at different times, respectively, and meanwhile, a first voltage signal provided by the power supply module 211 may be provided to the touch driver electrodes 110 of the touch driver electrode columns 110' through the switch modules 212 at different times, so that the touch driver electrodes 110 may receive the touch drive signal provided by the touch driver circuit 220 and the first voltage signal provided by the touch auxiliary circuit 210 at the same time. Therefore, the charging speed of the capacitor formed by the touch driver electrode 110 and the touch sensing electrode 120 is improved, the charging time is shortened, the sampling time is saved, and the report rate of the touch display panel 10 is improved.

Correspondingly, in a touch stage in which the refresh frequency of the touch display panel 10 is the second frequency, only the touch driver circuit 220 provides the touch drive signal for the touch driver electrodes 110, and the power supply module 211 may stop providing the first voltage signal. In this case, each switch module 212 may be in a turned off state so as to reduce the power consumption of the touch display panel 10 on the premise of satisfying different display requirements.

In an exemplary embodiment, the switch module 212 may include a first transistor; a gate of the first transistor is a control terminal of each switch module 212, a first electrode of the first transistor is the input terminal 2121 of each switch module 212, and a second electrode of the first transistor is an output terminal 2122 of each switch module 212. Therefore, the first transistor may be controlled to be turned on or to be turned off by controlling a respective control signal to be provided to the gate of the first transistor, and thus the switching function of the switch module 212 is achieved.

The first transistor may be a P-type transistor, and in this case, the first transistor is in the turned off state when a high-level signal is provided to the gate of the first transistor, and the first transistor is in the turned on state when a low-level signal is provided to the first transistor, that is, the low-level signal is an enable level of a control signal provided for the gate of the first transistor; or the first transistor may be an N-type transistor, and in this case, the first transistor is in the turned on state when a high-level signal is provided to the gate of the first transistor, and the first transistor is in the turned off state when a low-level signal is provided to the first transistor, that is, the high-level signal is an enable level of a control signal provided to the gate of the first transistor.

Figure 6:
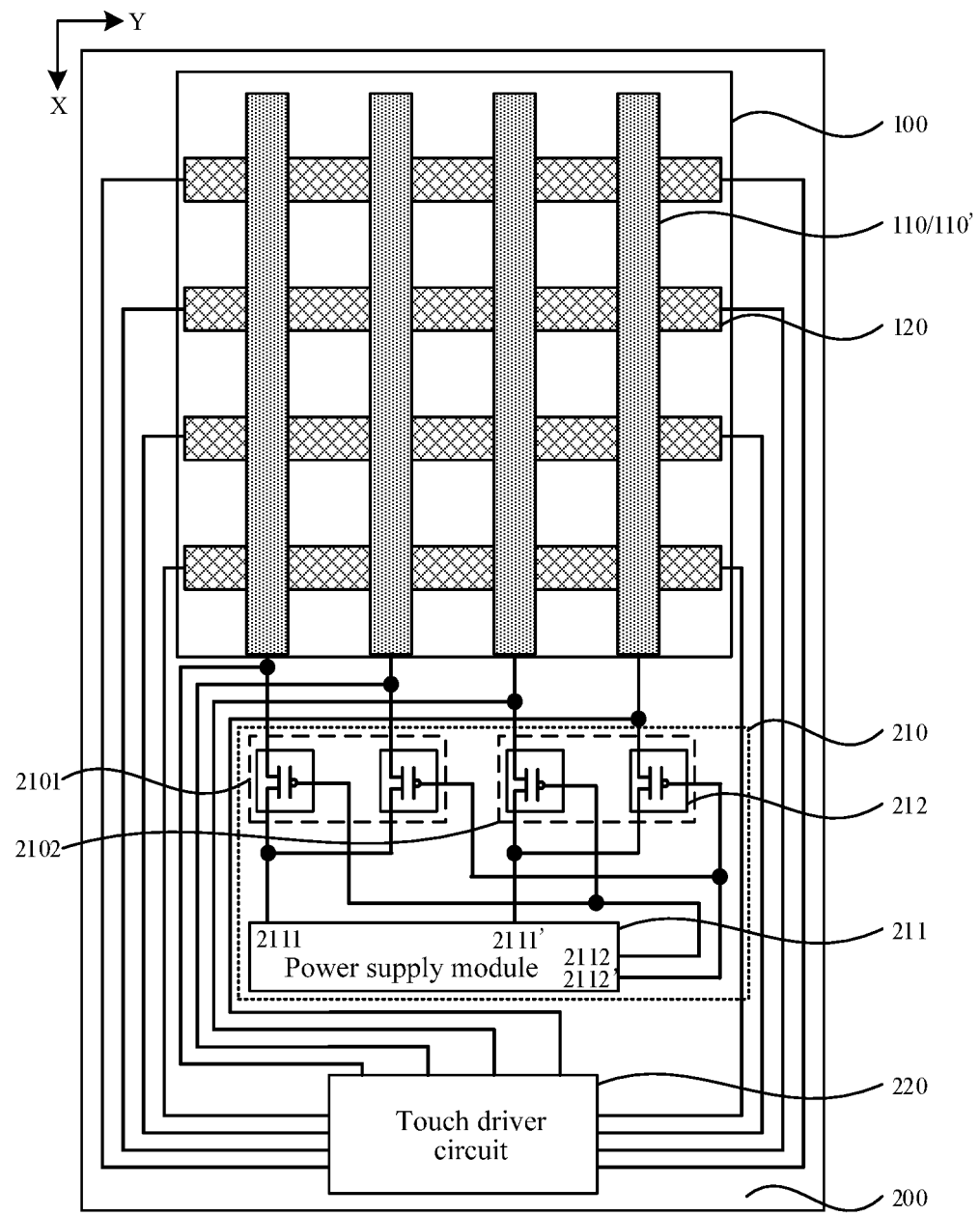
FIG. 6 is a schematic structural diagram of a touch display panel provided in another embodiment of the present disclosure.

In an embodiment, FIG. 6 is a schematic structural diagram of a touch display panel provided in another embodiment of the present disclosure, as shown in FIG. 6, the power supply module 211 may include a plurality of control signal output terminals (2112, 2112') and at least one voltage signal output terminal (2111, 2111'); the plurality of switch modules 212 may form at least one first gating circuit (2101, 2102); an input terminal of each switch module 212 of a same first gating circuit 2101 (2102) is electrically connected to a same voltage signal output terminal 2111 (2111'), and a control terminal of each switch module 212 of a same first gating circuit 2101 (2102) is electrically connected to different control signal output terminals (2112 and 2112'); and the power supply module 211 is configured to provide an enable level of a control signal for the control terminal of each switch module 212 of a same first gating circuit 2101 (2102) at different times in the touch stage in which the refresh frequency is the first frequency, so as to control each switch module 212 of a same first gating circuit 2101 (2102) to be turned on at different times.

In an exemplary embodiment, each first gating circuit 2101 (2102) including two switch modules 212 is taken as an example, control terminals of the two switch modules 212 of the first gating circuit 2101 (2102) are electrically connected to two different control signal output terminals 2112 and 2112' in the power supply module 211, respectively, so that the two switch modules 212 are turned on or off under the control of control signals output by the two control signal output terminals 2112 and 2112', respectively; that is, when the two control signal output terminals 2112 and 2112' output enable levels of the control signals at different times, the two switch modules 212 of a same first gating circuit 2101 (2102) may be conductive during different time periods, and therefore the first voltage signal may be provided for the touch driver electrode columns 110' electrically connected to the two switch modules 212 of a same first gating circuit 2101 (2102) at different times, so as to prevent the signals received by the touch driver electrode columns 110' from interfering with each other.

Meanwhile, control terminals of the switch modules of different first gating circuits may be electrically connected to a same control signal output terminal, for example, a control terminal of one switch module of the two switch modules 212 in the first gating circuit 2101 and a control terminal of one switch module of the two switch modules 212 in the first gating circuit 2102 may be electrically connected to a same control signal output terminal 2112, and a control terminal of the other switch module of the two switch modules 212 in the first gating circuit 2101 and a control terminal of the other switch module of the two switch modules 212 in the first gating circuit 2102 may be electrically connected to a same control signal output terminal 2112'. Therefore, a number of control signal output terminals disposed in the power supply module 211 may be reduced, the structure of the power supply module 211 is simplified, and thus the cost of the power supply module 211 may be reduced.

Correspondingly, the switch modules belonging to different first gating circuits are electrically connected to different voltage signal output terminals, for example, an input terminal of the switch module 212 in the first gating circuit 2101 and an input terminal of the switch module 212 in the first gating circuit 2102 are electrically connected to different voltage signal output terminals (2111 and 2111'), and the different voltage signal output terminals (2111 and 2111') output the first voltage signals at different times, so as to prevent the occurrence of a situation that accuracy of the touch detection is affected by outputting the first voltage signal at the same time when the switch modules 212 sharing the control signal output terminal (2112 or 2112') are simultaneously turned on.

It should be noted that FIG. 6 is merely an exemplary diagram of an embodiment of the present disclosure, and FIG. 6 shows that each first gating circuit 2101 (2102) includes two switch modules 212 by way of example only, and in the embodiments of the present disclosure, each first gating circuit 2101 (2102) may include one, two, or more switch modules 212, which is not specifically limited in the embodiments of the present disclosure.

Figure 7:
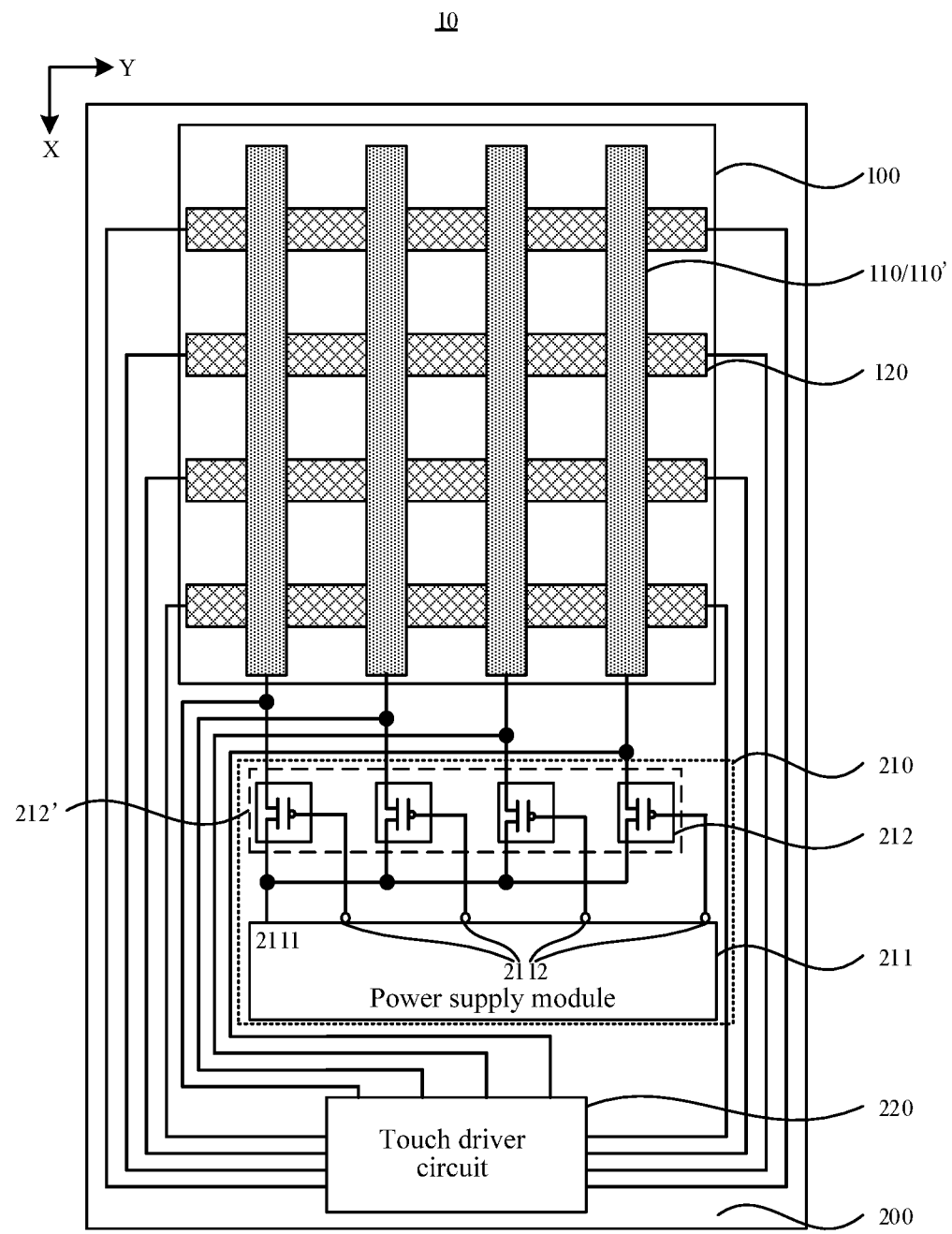
FIG. 7 is a schematic structural diagram of a touch display panel provided in another embodiment of the present disclosure.

In an exemplary embodiment, FIG. 7 is a schematic structural diagram of a touch display panel provided in another embodiment of the present disclosure. The same in FIG. 7 as in FIG. 6 may be referred to the above description of FIG. 6, and only the differences in FIG. 7 from FIG. 6 are exemplarily described here. As shown in FIG. 7, the plurality of switch modules 212 of the touch auxiliary circuit 210 form a first gating circuit 212', and in this case, the control terminals of the plurality of switch modules 212 each is electrically connected to a different control signal output terminal 2112, and the input terminals of the plurality of switch modules 212 each is electrically connected to a same voltage signal output terminal 2111. In this case, different control signal output terminals 2112 each output an enable level of a control signal at a different time so as to control different switch modules 212 to be turned on at different times. Therefore, a number of voltage signal output terminals 2111 may also be reduced, the structure of the power supply module 211 may be simplified, and thus the cost of the power supply module 211 may be reduced.

It should be understood that the above-described control signals output to the switch modules are provided by the power supply module, and the control signals output to the control terminals of the switch modules may be provided by other modules as required on the premise that the switch modules of a same first gating circuit may be controlled to be turned on at different times. The following is an exemplary description for different scenarios.

Figure 8:
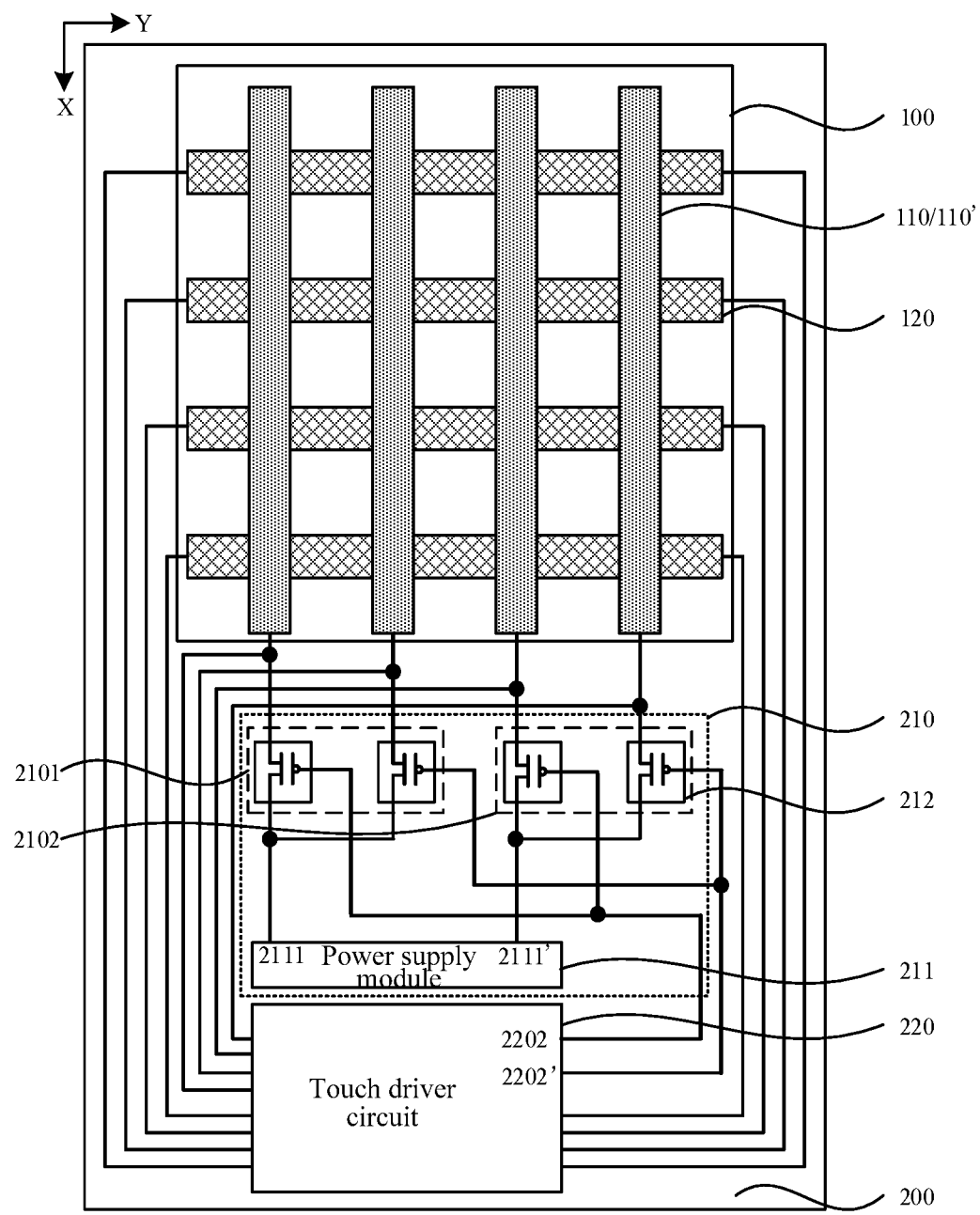
FIG. 8 is a schematic structural diagram of a touch display panel provided in another embodiment of the present disclosure.

In an embodiment, FIG. 8 is a schematic structural diagram of a touch display panel provided in another embodiment of the present disclosure, and as shown in FIG. 8, the touch driver circuit 220 may include a plurality of control signal output terminals (2202, 2202'); the power supply module 211 may include at least one voltage signal output terminal (2111, 2111'); the plurality of switch modules 212 form at least one first gating circuit (2101, 2102); an input terminal of each switch module 212 of a same first gating circuit of the at least one first gating circuit (2101, 2102) is electrically connected to a same voltage signal output terminal 2111 (2111'), and a control terminal of each switch module 212 of a same first gating circuit 2101 (2102) is electrically connected to a different control signal output terminal of the plurality of control signal output terminals (2202 and 2202'); the touch driver circuit 220 is configured to provide an enable level of a control signal for a control terminal of each switch module 212 of a same first gating circuit 2101 (2102) at different times in the touch stage, so as to control each switch module 212 of a same first gating circuit 2101 (2102) to be turned on at different times.

In an exemplary embodiment, each first gating circuit 2101 (2102) including two switch modules 212 is taken as an example, control terminals of the two switch modules 212 of the first gating circuit 2101 (2102) are electrically connected to two different control signal output terminals 2202 and 2202' in the touch driver circuit 220, respectively, so that the two switch modules 212 are turned on or off under the control of control signals output by the two control signal output terminals 2202 and 2202' respectively; that is, when the two control signal output terminals 2202 and 2202' of the touch driver circuit 220 output enable levels of control signals at different times, the two switch modules 212 of a same first gating circuit 2101 (2102) may be conductive during different time periods, that is, the switch modules 212 may be controlled by the touch driver circuit 220 to be turned on at different times. Meanwhile, the control terminals of the switch modules of different first gating circuits (2101 and 2102) may be electrically connected to a same control signal output terminal, a number of the control signal output terminals disposed in the touch driver circuit 220 may be reduced, the structure of the touch driver circuit 220 is simplified, and thus the cost of the touch driver circuit 220 may be reduced.

It should be noted that FIG. 8 is merely an exemplary diagram of an embodiment of the present disclosure, and FIG. 8 only exemplarily shows that each first gating circuit 2101 (2102) includes two switch modules 212, and in the embodiments of the present disclosure, each first gating circuit 2101 (2102) may include one, two, or more switch modules 212, which is not specifically limited in the embodiments of the present disclosure.

Figure 9:
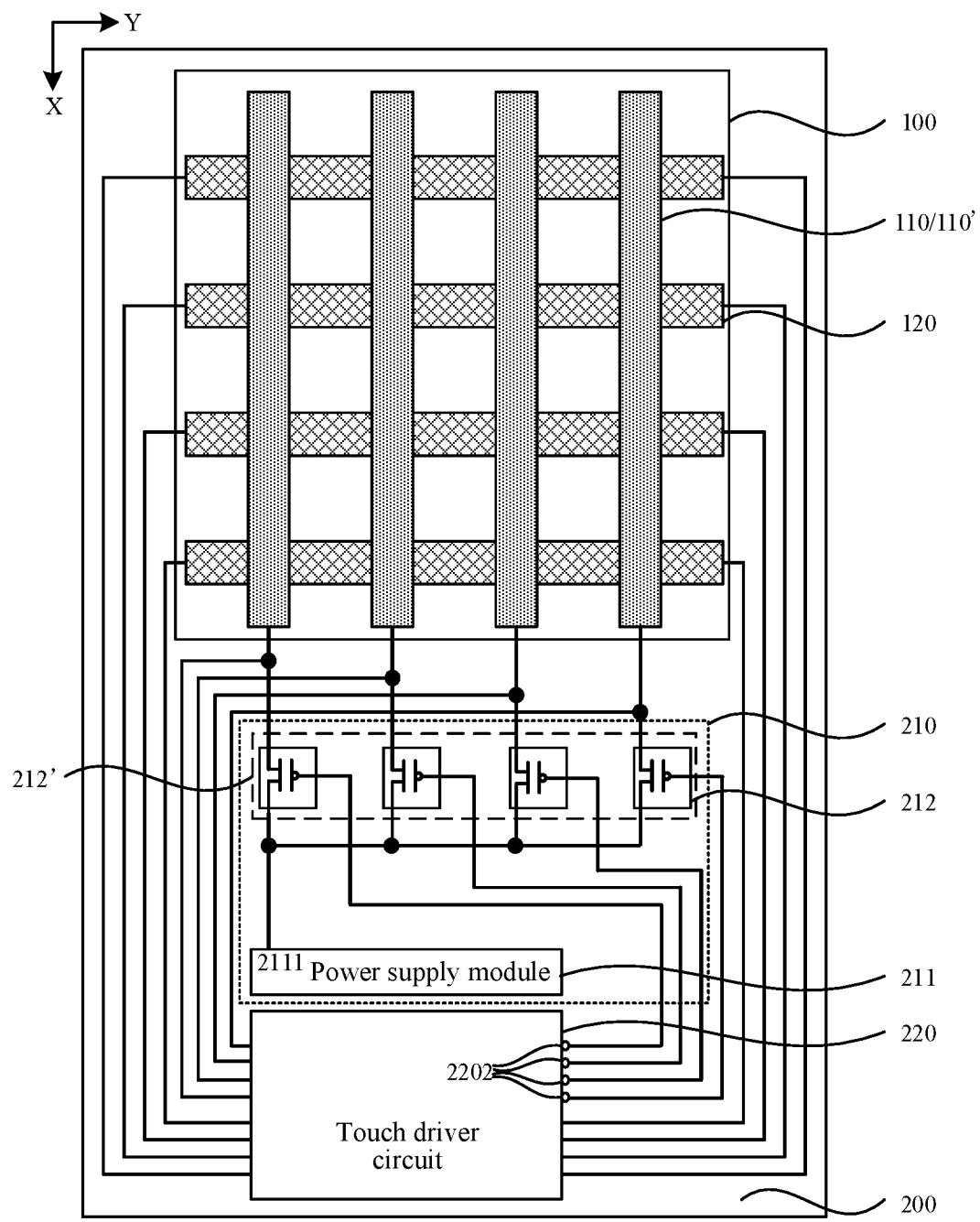
FIG. 9 is a schematic structural diagram of a touch display panel provided in another embodiment of the present disclosure.

In an exemplary embodiment, FIG. 9 is a schematic structural diagram of a touch display panel provided in another embodiment of the present disclosure. The same in FIG. 9 as in FIG. 8 may be referred to the above description of FIG. 8, and only the differences in FIG. 9 from FIG. 8 are exemplarily described here. As shown in FIG. 9, the plurality of switch modules 212 of the touch auxiliary circuit 210 form a first gating circuit 212', and in this case, the control terminal of each switch module 212 is electrically connected to a different control signal output terminal 2202. Whereas the input terminal of each switch modules 212 is electrically connected to a same voltage signal output terminal 2111, and in this case, the different control signal output terminals 2202 output an enable level of a control signal at different times so as to control different switch modules 212 to be turned on at different times. Therefore, a number of voltage signal output terminals 2111 may also be reduced, the structure of the power supply module 211 may also be simplified, and thus the cost of the power supply module 211 is reduced.

Figure 10:
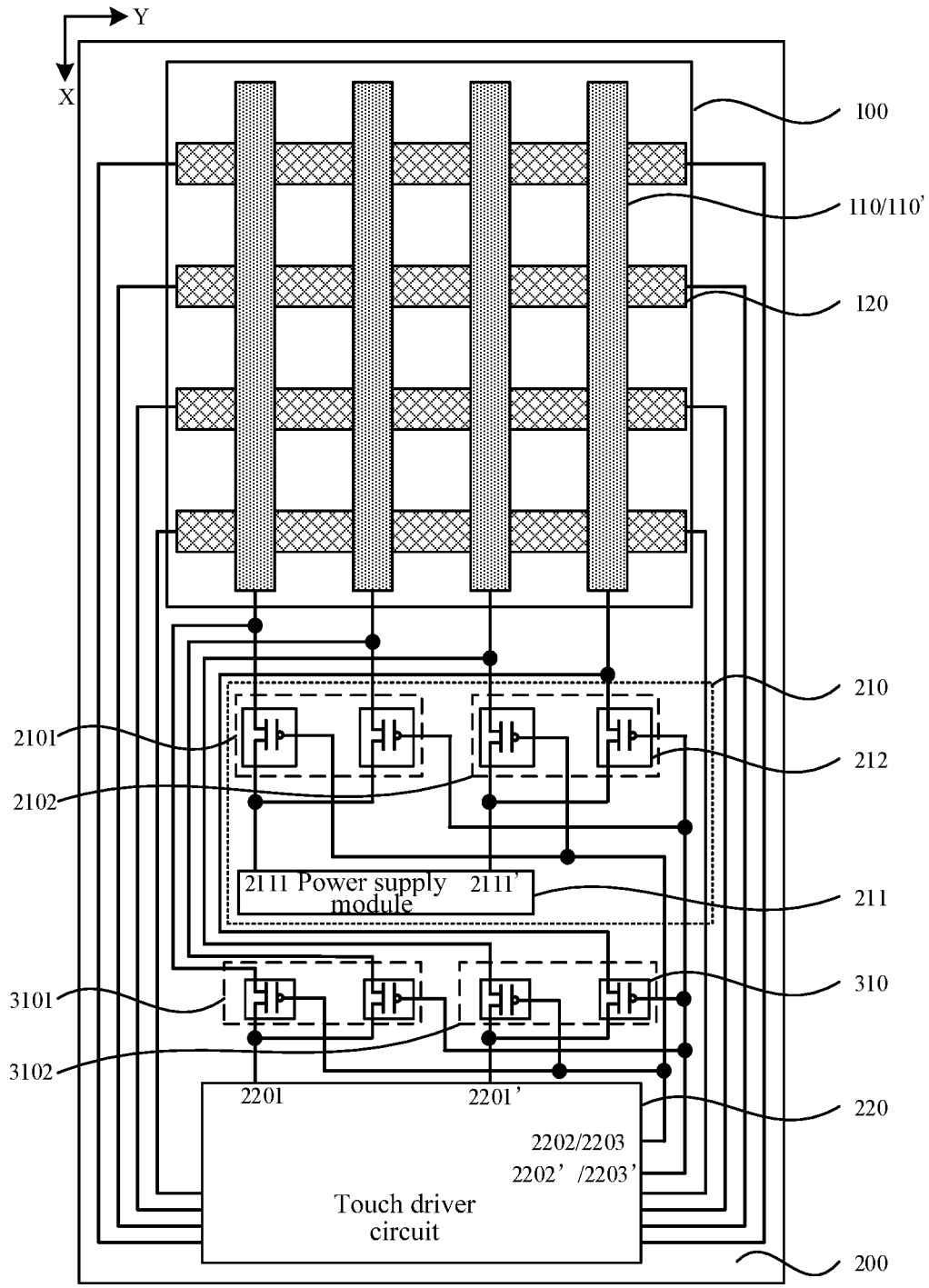
FIG. 10 is a schematic structural diagram of a touch display panel provided in another embodiment of the present disclosure.

In an embodiment, FIG. 10 is a schematic structural diagram of a touch display panel provided in another embodiment of the present disclosure, as shown in FIG. 10, the touch driver circuit 220 may further include a plurality of touch drive signal output terminals (2201, 2201') and at least one gating control terminal (2203, 2203'); the touch display panel 10 may further include at least one second gating circuit (3101, 3102); each second gating circuit 3101 (3102) may include at least one gating switch 310; an control terminal of each gating switch 310 of a same second gating circuit 3101 (3102) is electrically connected to a different gating control terminal (2203 and 2203'), and an input terminal of each gating switch 310 of a same second gating circuit 3101 (3102) is electrically connected to a same touch drive signal output terminal 2201 (2201'); an output terminal of each gating switch 310 is electrically connected to each touch driver electrode 110 belonging to a same touch driver electrode column 110'; in the touch stage, each gating control terminal 2203 (2203') outputs the touch drive signal to each touch driver electrode 110 of each touch driver electrode column 110', and the gating control terminal 2203 (2203') is multiplexed as the control signal output terminal 2202 (2202').

In an exemplary embodiment, each second gating circuit 3101 (3102) including two gating switches 310 is taken as an example, control terminals of the two gating switches 310 of the second gating circuit 3101 (3102) are electrically connected to different gating control terminals 2203 and 2203', respectively, so that the two gating switches 310 are turned on or off under the control of control signals output by the two gating control terminals 2203 and 2203', respectively, that is, when the two gating control terminals 2203 and 2203' output enable levels of the control signals at different times, the two gating switches 310 of a same second gating circuit 3101 (3102) may be conductive during different time periods, and therefore the first voltage signal may be provided for the touch driver electrode columns 110' electrically connected to the two gating switches 310 of a same second gating circuit 3101 (3102) at different times, so as to prevent the signals received by the touch driver electrode columns 110' from interfering with each other.

Meanwhile, control terminals of the gating switches of different second gating circuits may be electrically connected to a same gating control terminal, for example, a control terminal of one gating switch of the two gating switches 310 in the second gating circuit 3101 and a control terminal of one gating switch of the two gating switches 310 in the second gating circuit 3102 may be electrically connected to a same gating control terminal 2203, and a control terminal of the other gating switch of the two gating switches 310 in the second gating circuit 3101 and a control terminal of the other gating switch of the two gating switches 310 in the second gating circuit 3102 may be electrically connected to a same gating control terminal 2203'. Therefore, a number of gating control terminals disposed in the touch driver circuit 220 may be reduced, the structure of the touch driver circuit 220 is simplified, and thus the cost of the touch driver circuit 220 may be reduced.

Correspondingly, the gating switches belonging to different second gating circuits are electrically connected to different touch drive signal output terminals; for example, an input terminal of the gating switch 310 in the second gating circuit 3101 and an input terminal of the gating switch 310 in the second gating circuit 3102 are electrically connected to different touch drive signal output terminals (2201 and 2201'), and different voltage signal output terminals (2201 and 2201') output the touch drive voltage signals at different times, so as to prevent the occurrence of a situation that accuracy of the touch detection is affected by outputting the touch drive signal at the same time when the gating switches 310 sharing the gating control terminal (2203 or 2203') are simultaneously turned on.

The gating control terminal 2203 (2203') is multiplexed as a control signal output terminal 2202 (2202'), that is, the control signal output terminal 2202 (2202') and the gating control terminal 2203 (2203') of the touch driver circuit 220 share one terminal, and a control signal output by the gating control terminal 2203 (2203') may not only control a corresponding gating switch 310 to be turned on or off, but also may control a corresponding switch module 212 to be turned on or off, therefore, a number of terminals disposed in the touch driver circuit 220 may be further reduced, the structure of the touch driver circuit 220 is simplified, and the cost of the touch driver circuit 220 is reduced.

It should be noted that FIG. 10 is merely an exemplary diagram of an embodiment of the present disclosure, and FIG. 10 only exemplarily shows that each second gating circuit 3101 (3102) includes two gating switches 310, and in the embodiments of the present disclosure, each second gating circuit 3101 (3102) may include one, two or more gating switches 310, which is not specifically limited in the embodiments of the present disclosure.

Figure 11:
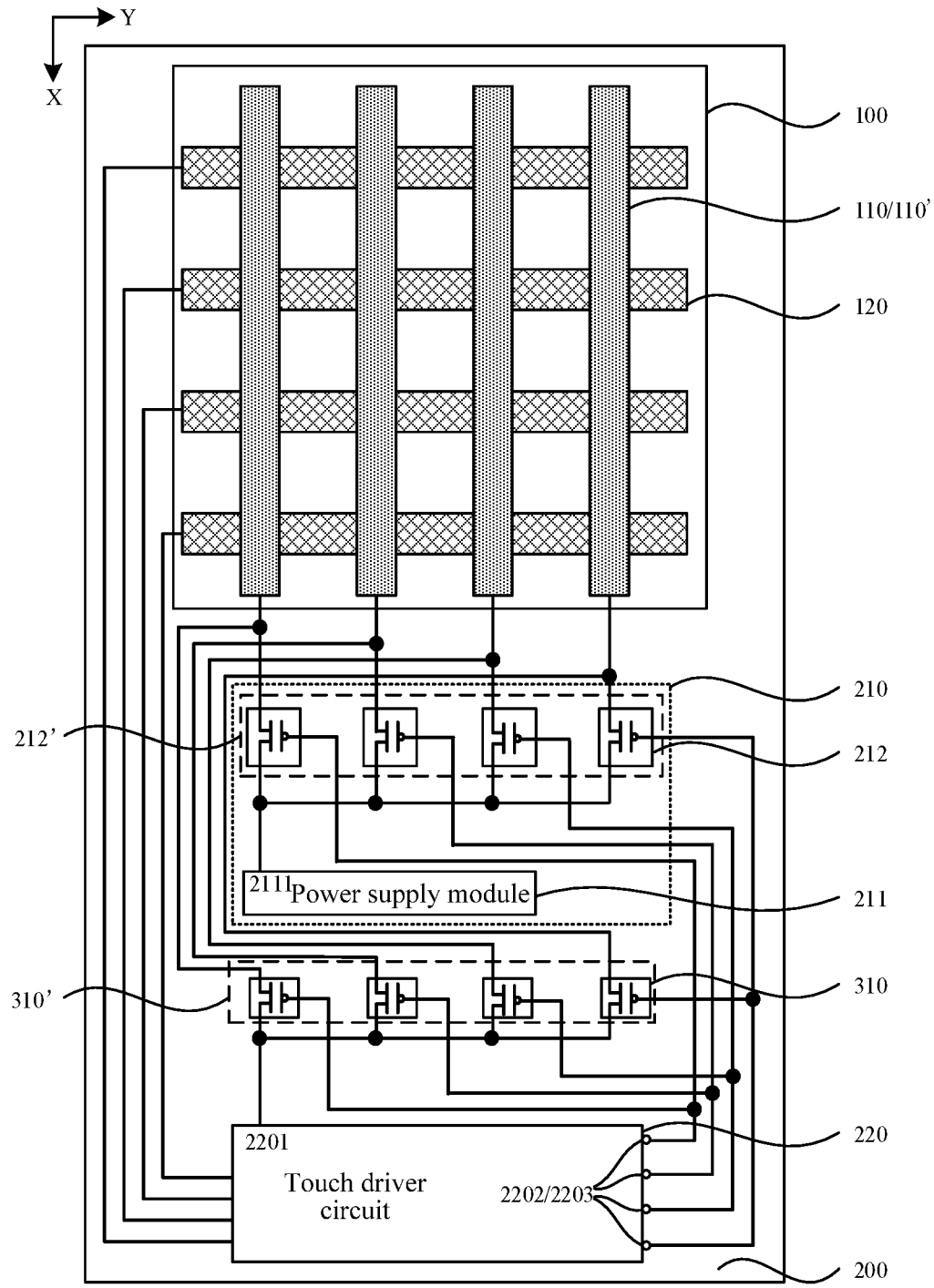
FIG. 11 is a schematic structural diagram of a touch display panel provided in another embodiment of the present disclosure.

Illustratively, FIG. 11 a schematic structural diagram of a touch display panel provided in another embodiment of the present disclosure. The same in FIG. 11 as in FIG. 10 may be referred to the above description of FIG. 10, and only the differences in FIG. 11 from FIG. 10 are exemplarily described here. As shown in FIG. 11, a plurality of gating switches 310 of the touch display panel 10 form a second gating circuit 310', and in this case, the control terminal of each gating switch 310 is electrically connected to a different gating control terminal 2203. A plurality of switch modules 212 of the touch auxiliary circuit 210 form a first gating circuit 212', and in this case, the control terminal of each switch module 212 is electrically connected to a different control signal output terminal 2202. The gating control terminal 2203 is multiplexed as the control signal output terminal 2202, that is, the control terminals of the switch modules 212 are electrically connected to different gating control terminals 2203, while the input terminal of each switch module 212 is electrically connected to a same voltage signal output terminal 2111, and the input terminal of each gating switch 310 is electrically connected to a same touch drive signal output terminal 2201. In this case, different gating control terminals 2203 output the enable level of the control signal at different times so as to control different gating switches 310 to be turned on at different times and the different switch modules 212 to be turned on at different times. Therefore, a number of the touch drive signal output terminals 2201 and the voltage signal output terminals 2111 may be reduced, the structures of the touch driver circuit 220 and the power supply module 211 may also be simplified, and the cost of the touch driver circuit 220 and the power supply module 211 is reduced.

Figure 12:
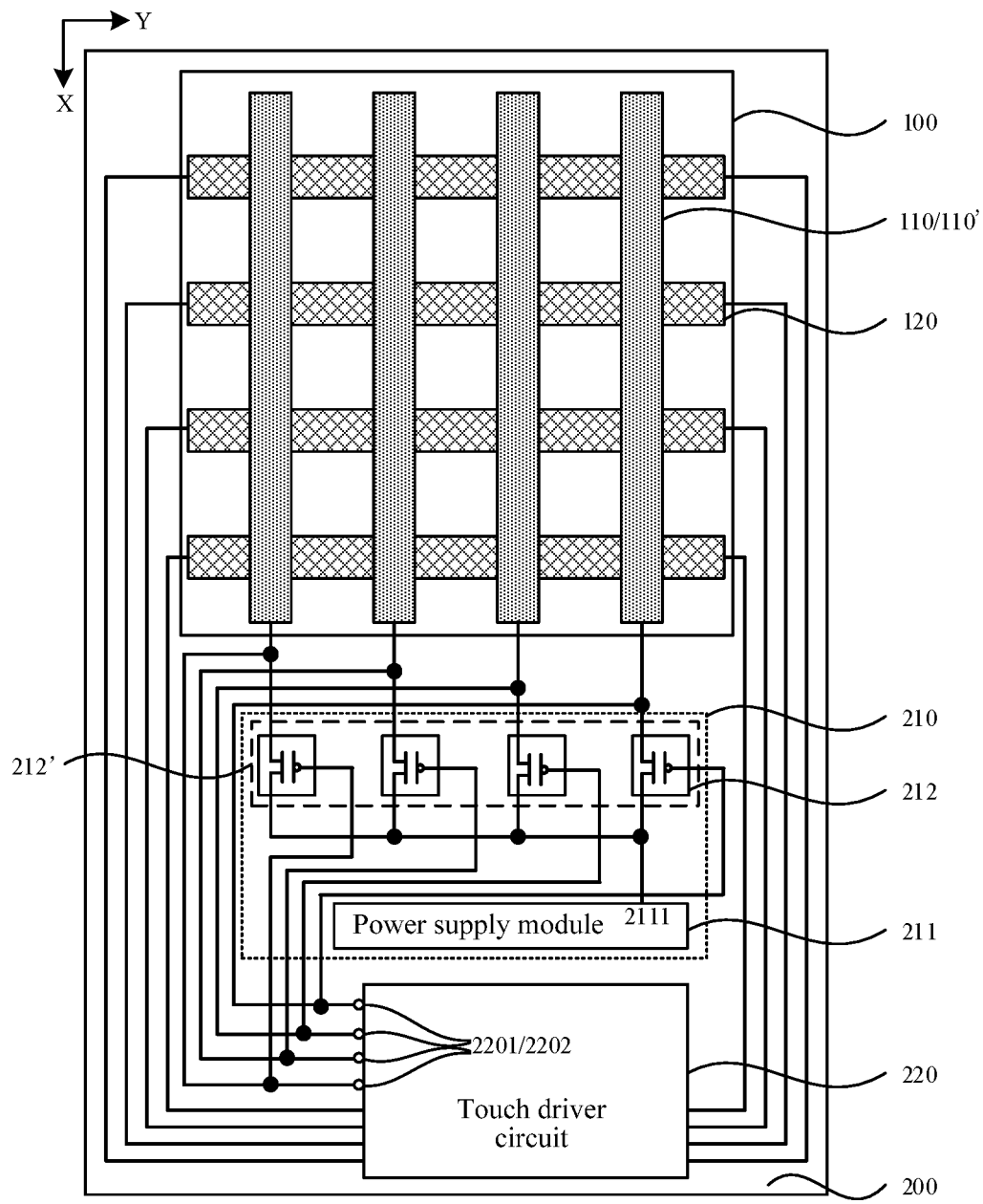
FIG. 12 is a schematic structural diagram of a touch display panel provided in another embodiment of the present disclosure.

In an embodiment, FIG. 12 is a schematic structural diagram of a touch display panel provided in another embodiment of the present disclosure, as shown in FIG. 12, a plurality of switch modules 212 may form a first gating circuit 212', the touch driver circuit 220 may further include a plurality of touch drive signal output terminals 2201; each touch driver electrode 110 belonging to a same touch driver electrode column 110' is electrically connected to a same touch drive signal output terminal 2201, in the touch stage, each touch drive signal output terminal 2201 outputs touch drive signals to each touch driver electrode 110 of each touch driver electrode column 110' at different times, and the touch drive signal output terminal 2201 is multiplexed as the control signal output terminal 2202.

In an exemplary embodiment, each touch drive signal output terminal 2201 is electrically connected to the touch driver electrode 110 of each touch driver electrode column 110', and the touch drive signal output terminal 2201 is multiplexed as the control signal output terminal 2202, that is, each touch drive signal output terminal 2202 is also electrically connected to the control terminal of each switch module 212, and the input terminal of each switch module 212 is electrically connected to one voltage signal input terminal 2111. In the touch stage in which the refresh frequency is the first frequency, the touch driver circuit 220 controls each touch drive signal output terminal 2201 so as to output touch drive signals at different times. The touch drive signals may not only be transmitted to each touch driver electrode 110 of a corresponding touch driver electrode column 110' so as to provide a touch drive signal for each touch driver electrode 110, and the touch drive signal may also be transmitted to a control terminal of a corresponding switch module 212 so as to control the corresponding switch module 212 to be turned on, whereby the power supply module 211 transmits the first voltage signal to each touch driver electrode 110 of the corresponding touch driver electrode column 110' through the turned-on switch module 212, so that each touch driver electrode 110 of the corresponding touch driver electrode column 110' may receive the touch drive signal and the first voltage signal. Therefore, a number of terminals of the power supply module 211 and a number of terminals of the touch driver circuit 220 may be further reduced, the structure of the power supply module 211 and the structure of the touch driver circuit 220 are simplified, and the cost of the power supply module 211 and the cost of the touch driver circuit 220 are reduced.

Figure 13:
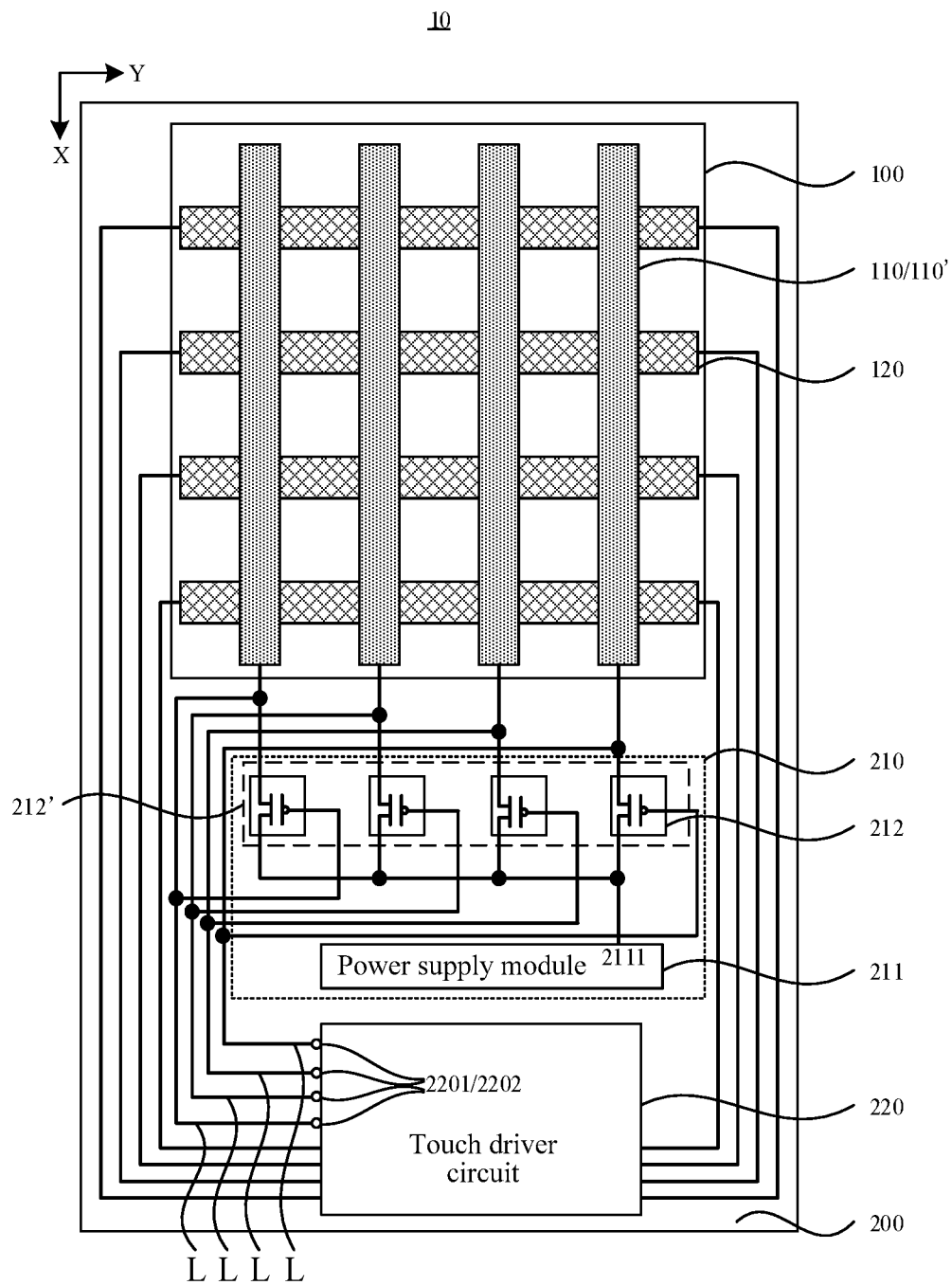
FIG. 13 is a schematic structural diagram of a touch display panel provided in another embodiment of the present disclosure.

In an embodiment, FIG. 13 is a schematic structural diagram of a touch display panel provided in another embodiment of the present disclosure, as shown in FIG. 13, the non-display region 200 may further include a plurality of touch drive signal transmission lines L; each touch driver electrode 110 belonging to a same touch driver electrode column 110' is electrically connected to a same touch drive signal output terminal 2201 through a same touch drive signal transmission line L, and the control terminals 2123 of the plurality of switch modules 212 are electrically connected to the plurality of touch drive signal output terminals 2201 through the plurality of touch drive signal transmission lines L in an one-to-one correspondence manner.

Therefore, when the touch drive signal output terminal 2201 is multiplexed as the control signal output terminal 2202, the touch drive signal transmission line L may be multiplexed as the control signal transmission line, so that in the touch stage when the refresh frequency of the touch display panel 10 is the first frequency, touch drive signals output by the touch drive signal output terminals 2201 may be transmitted to a corresponding touch driver electrode column 110' and the control terminals of the switch modules 212 through a same touch drive signal transmission line L so as to control the switch modules 212 to be turned on, so that first voltage signals output by the voltage signal output terminal 2111 may be transmitted to a corresponding touch driver electrode column 110' through the conductive switch module 212. Compared with a condition that the touch drive signal transmission line L and the control signal transmission line are provided at the same time, a number of the signal transmission lines in the non-display region 200 may be reduced, whereby a narrow frame of the touch display panel 10 is facilitated, and the screen-to-body ratio of the touch display panel 10 is improved; meanwhile, since the touch drive signal output terminal 2201 is multiplexed as the control signal output terminal 2202, and the touch drive signal transmission line L is multiplexed as the control signal transmission line, so that the signal delay time between the touch drive signal and the first voltage signal received by the touch driver electrode column 110' may be shortened, so that the touch drive signal and the first voltage signal may reach a corresponding touch driver electrode column 110' in synchronization, a charging speed is further improved, a charging time is shortened, a touch reporting rate is further improved, and the touch and display requirements for the high refresh frequency are satisfied.

Figure 14:
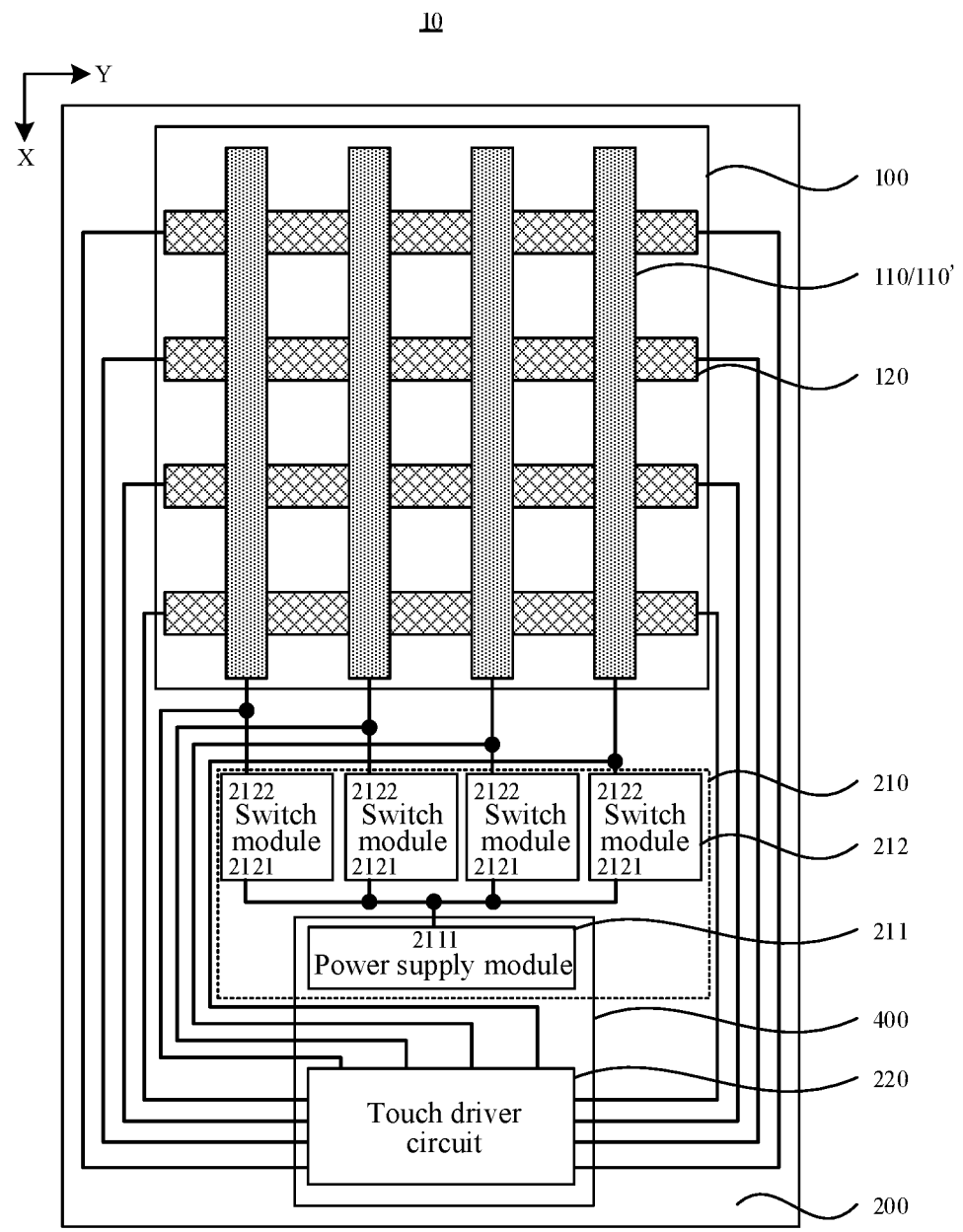
FIG. 14 is a schematic structural diagram of a touch display panel provided in another embodiment of the present disclosure.

In an embodiment, FIG. 14 is a schematic structural diagram of a touch display panel provided in another embodiment of the present disclosure, and as shown in FIG. 14, the power supply module 211 and the touch driver circuit 220 may be integrated in a same touch driver chip 400. Therefore, the touch driver chip 400 may not only implement the function of the touch driver circuit 220 and may also implement the function of the power supply module 211, and thus a respective driver chip does not need to be additionally provided for implementing the function of the power supply module 211, so that a number of driver chips disposed in the touch display panel 10 is reduced, which is beneficial to simplifying the structure of the touch display panel 10, and thus reducing the cost of the touch display panel 10.

It should be understood that the control signals output to each switch module are provided by the touch driver circuit only by way of example, and the control signals of each switch module may also be controlled by other circuits existing in the touch display panel in the embodiments of the present disclosure.

Figure 15:
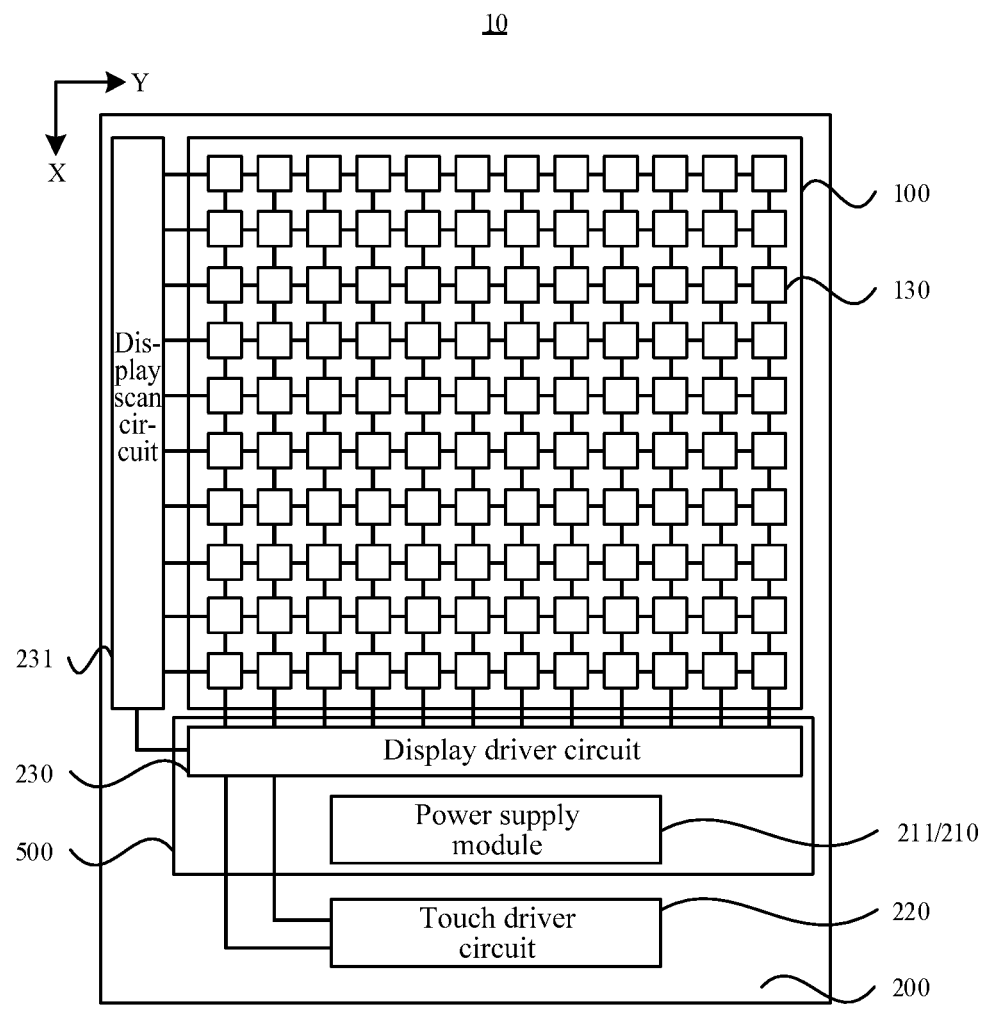
FIG. 15 is a schematic structural diagram of a touch display panel provided in another embodiment of the present disclosure.

It should be understood that FIG. 15 is a schematic structural diagram of a touch display panel provided in another embodiment of the present disclosure, and as shown in FIG. 15, the touch display panel 10 integrates dual functions of touch and display, so that a plurality of display units 130 arranged in array are further disposed in the display region 100 of the touch display panel 10, and a display driver circuit 230 is further disposed in the non-display region 200 of the touch display panel 10, so that in a display stage, the display driver circuit 230 may provide a display signal for each display unit 130 so as to control each display unit 130 to display.

In an exemplary embodiment, the non-display region 200 of the touch display panel 10 may further include a display scan circuit 231. When the touch display panel 10 is in the display stage, the display driver circuit 230 may control the display scan circuit 231 to sequentially output the enable levels of the scan signals to each row of the display units 130, so that the display driver circuit 230 may write the data signals into each display unit 130 in a one-to-one correspondence manner, so as to control each display unit 130 to display, whereby the display effect of the touch display panel 10 is achieved.

In addition, the display driver circuit 230 is further electrically connected to the touch driver circuit 220, so that the display driver circuit 230 may also perform an information interaction with the touch driver circuit 220, that is, when the touch driver circuit 220 detects a touch position, the touch position information may be sent to the display driver circuit 230, so that the display driver circuit 230 switches a display picture according to the touch position.

Figure 16:
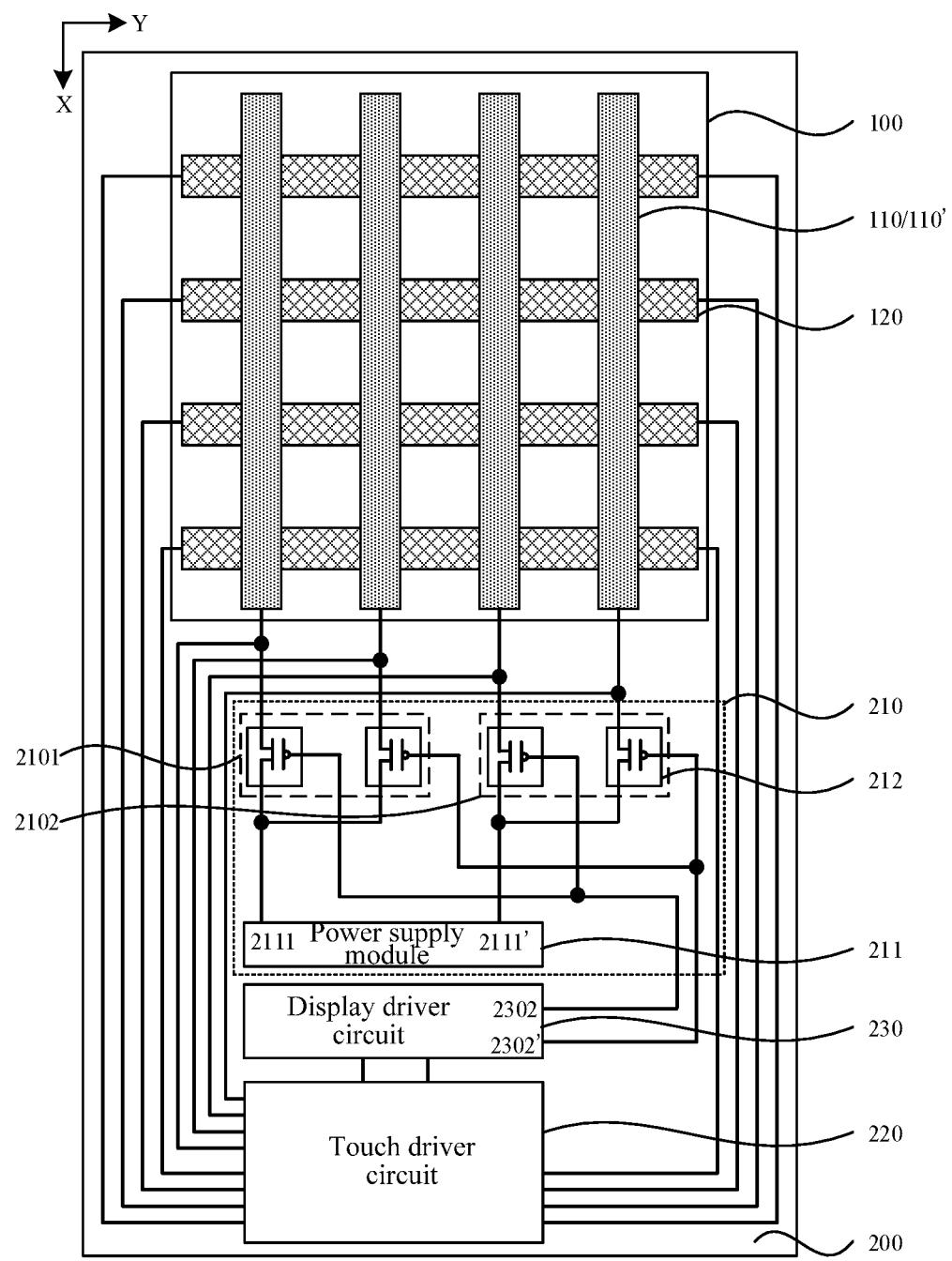
FIG. 16 is a schematic structural diagram of a touch display panel provided in another embodiment of the present disclosure.

Correspondingly, FIG. 16 is a schematic structural diagram of a touch display panel provided in another embodiment of the present disclosure, and as shown with combined reference to FIGS. 15 and 16, the power supply module 211 and the display driver circuit 230 may also be integrated in a same display driver chip 500; therefore, the display driver chip 500 may not only implement the function of the display driver circuit 230 and may also implement the function of the power supply module 211, and thus a respective driver chip does not need to be additionally provided for implementing the function of the power supply module 211, so that a number of driver chips disposed in the touch display panel 10 may be reduced, which is beneficial to simplifying the structure of the touch display panel 10 and reducing the cost of the touch display panel 10.

It should be noted that the touch driver circuit 220 and the display driver circuit 230 may be integrated into different driver chips, or the touch driver circuit 220 and the display driver circuit 230 may also be integrated into a same driver chip, so as to be able to drive the display unit 130, the touch driver electrode 110 and the touch sensing electrode 120 in the display region 100 of the touch display panel 10 by adopting a same driver chip, respectively, and to implement touch and display functions, which is not specifically limited in the embodiments of the present disclosure.

In an embodiment, with continued reference to FIG. 16, the display driver circuit 230 may include a plurality of control signal output terminals (2302, 2302'); the power supply module 211 may include at least one voltage signal output terminal (2111, 2111'); the plurality of switch modules 212 form at least one first gating circuit (2101, 2102); an input terminal of each switch module 212 of a same first gating circuit 2101 (2102) is electrically connected to a same voltage signal output terminal 2111 (2111'), and an control terminal of each switch module 212 of a same first gating circuit 2101 (2102) is electrically connected to different control signal output terminals (2301 and 2301'); and the display driver circuit 230 is further configured to provide an enable level of a control signal to a control terminal of each switch module 212 of a same first gating circuit 2101 (2102) at different times in a touch stage, so as to control each switch module 212 of a same first gating circuit 2101 (2102) to be turned on at different times.

In an exemplary embodiment, each first gating circuit 2101 (2102) including two switch modules 212 is taken as an example, control terminals of the two switch modules 212 of the first gating circuit 2101 (2102) are electrically connected to two different control signal output terminals 2302 and 2302' in the display driver circuit 230, respectively, so that the two switch modules 212 are turned on or off under the control of control signals output by the two control signal output terminals 2302 and 2302' respectively; that is, when the two control signal output terminals 2302 and 2302' of the display driver circuit 230 output enable levels of the control signals at different times, the two switch modules 212 of a same first gating circuit 2101 (2102) may be conductive during different time periods, that is, each switch module 212 may be controlled by the display driver circuit 230 to be turned on at different times.

Meanwhile, control terminals of the switch modules of different first gating circuits may be electrically connected to a same control signal output terminal, so that a number of control signal output terminals disposed in the display driver circuit 230 may be reduced, the structure of the display driver circuit 230 is simplified, and thus the cost of the display driver circuit 230 may be reduced.

It should be noted that FIG. 16 is merely an exemplary diagram of an embodiment of the present disclosure, and FIG. 16 shows that each first gating circuit 2101 (2102)

includes two switch modules 212 by way of example only, and in the embodiments of the present disclosure, each first gating circuit 2101 (2102) may include one, two, or more switch modules 212, which is not specifically limited in the embodiments of the present disclosure.

Figure 17:
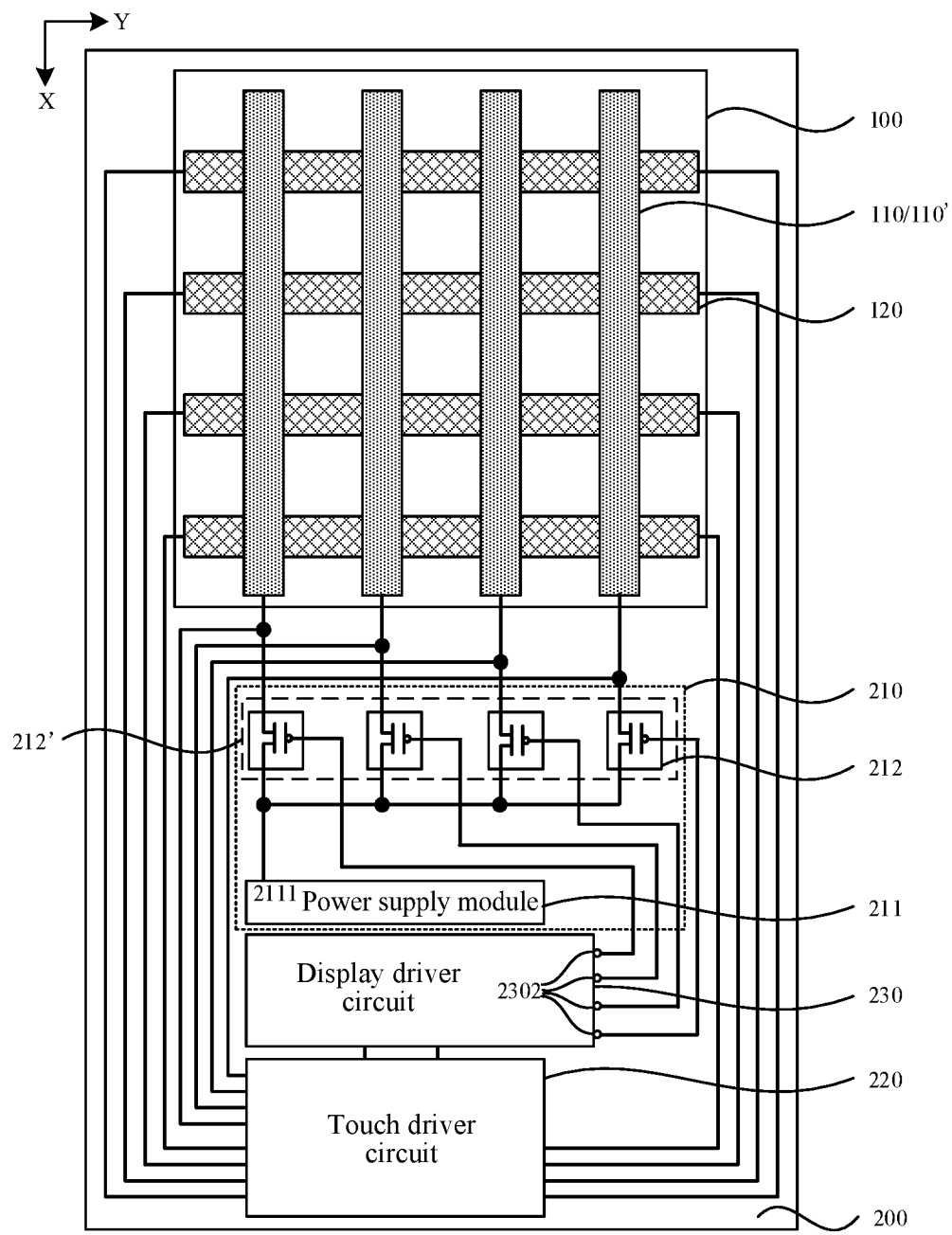
FIG. 17 is a schematic structural diagram of a touch display panel provided in another embodiment of the present disclosure.

Illustratively, FIG. 17 is a schematic structural diagram of a touch display panel provided in another embodiment of the present disclosure. The same in FIG. 17 as in FIG. 16 may be referred to the above description of FIG. 16, and only the differences in FIG. 17 from FIG. 16 are exemplarily described here. As shown in FIG. 17, the plurality of switch modules 212 of the touch auxiliary circuit 210 form a first gating circuit 212', and in this case, the control terminal of each switch module 212 is electrically connected to different control signal output terminals 2302, and the input terminal of each switch module 212 is electrically connected to a same voltage signal output terminal 2111; and in this case, the different control signal outputs 2302 output the enable level of the control signal at different times so as to control the different switch modules 212 to be turned on at different times. Therefore, a number of the voltage signal output terminals 2111 may also be reduced, the structure of the power supply module 211 may be simplified, and thus the cost of the power supply module 211 is reduced.

In an embodiment, FIG. 18 is a schematic diagram of a film layer of a touch display panel provided in an embodiment of the present disclosure, as shown with combined reference to FIGS. 15, 17 and 18, the display region 100 includes a display unit including a second transistor M2, the switch module 212 includes a first transistor M1, and the first transistor M1 may include a first active layer M1t, a first gate M1g, a first electrode M1s and a second electrode M1d, the second transistor M2 may include a second active layer M2t, a second gate M2g, a third electrode M2s and a fourth electrode M2d. In this case, the touch display panel 10 may further include a base substrate 40; the first active layer M1t and the second active layer M2t are disposed on a side of the base substrate 40 and are disposed on a same layer; the first gate M1g and the second gate M2g are disposed on a side of the base substrate 40 and are disposed on a same layer; and the first electrode M1s, the second electrode M1d, the third electrode M2s and the fourth electrode M2d are disposed on a side of the base substrate 40 and are disposed on a same layer. Therefore, the first transistor M1 and the second transistor M2 may be respectively prepared by adopting a same material in a same process, so that the process of the touch display panel 10 is simplified, and the preparation cost of the touch display panel 10 is reduced.

Based on a same inventive concept, an embodiment of the present disclosure further provides a method for driving a touch display panel, and the method for driving the touch display panel may be executed by the touch display panel provided in the embodiments of the present disclosure.

Therefore, the method for driving the touch display panel includes the technical features and beneficial effects of the touch display panel provided in the embodiments of the present disclosure, and the same may be referred to the above description of the touch display panel provided in the embodiments of the present disclosure. Correspondingly, FIG. 19 is a schematic flowchart of a method for driving a touch display panel provided in an embodiment of the present disclosure, and as shown in FIG. 19, the method for driving the touch display panel includes steps described below.

In S110, in a touch stage in which a refresh frequency is a first frequency, a touch drive signal and a first voltage signal is provided for each touch driver electrode column, and a touch sensing signal returned by each touch sensing electrode is received, respectively; where a voltage of the first voltage signal is greater than a voltage of the touch drive signal.

Specifically, a mutual capacitive touch sensor formed by a touch driver electrode and a touch sensing electrode is disposed in the touch display panel, so that when a touch object touches a touch surface of the touch display panel, a touch position of the touch object may be detected, and thus the touch display panel may be integrated with double functions of touch and display. Specifically, in order to prevent a display signal of the touch display panel for controlling a display unit thereof to display and the touch drive signal and a touch detection signal for determining the touch position from affecting each other, the touch stage and a display stage of the touch display panel are generally performed separately, so that one frame of display image of the touch display panel may include a plurality of touch stages and a plurality of display stages, the display signal may be provided to at least part of display units in each display stage, and the touch drive signal may be provided to each of the touch driver electrodes in each touch stage, and touch detection signals fed back by each touch sensing electrode 120 are received in each touch stage.

In the touch stage in which the refresh frequency is the first frequency, the touch auxiliary circuit may provide a first voltage signal for each touch driver electrode, and a voltage of the first voltage signal is greater than a voltage of the touch drive signal, so that when the refresh frequency is the first frequency, a signal provided to each touch driver electrode is a sum of the first voltage signal and the touch drive signal, so that the capacitor formed by the touch driver electrode and the touch sensing electrode may be quickly charged, and the charging time of the capacitor formed by the touch driver electrode and the touch sensing electrode is shortened; therefore, the time required by each touch stage is shortened, a report rate is improved, and the display requirement for the high refresh frequency is further satisfied. The first frequency may be a higher refresh frequency, for example, the first frequency includes, but is not limited to, 120 Hz.

In S120, the touch position is determined according to the touch sensing signal returned by each touch sensing electrode.

Specifically, when a finger or a touch pen touch object or the like touches the touch surface of the touch display panel, the capacitance of a capacitor formed by the touch driver electrode and the touch sensing electrode at the touch position changes, and the variation of a capacitor at each position may be obtained through a touch sensing signal returned by the touch sensing electrode, whereby the touch position of the touch object is obtained, and the touch display panel is controlled to display a corresponding picture according to the instruction feature at the touch position.

According to the technical schemes provided in the embodiments of the present disclosure, the relatively large first voltage signal is provided to the touch driver electrode besides providing a conventional touch drive signal for the touch driver electrode in the touch stage, so that compared with a condition that the touch drive signal is only provided to the touch driver electrode, the electric signal provided to each touch driver electrode may be increased, and the charging requirement of the capacitor formed by the touch driver electrode and the touch sensing electrode may be satisfied in a relatively short time, whereby the charging time of the touch driver electrode and the touch sensing electrode may be shortened, the report rate may be increased, and the touch requirement for the high refresh frequency may be satisfied.

It should be noted that when the first frequency is a relatively high refresh frequency, the relatively high refresh frequency may satisfy a use condition with higher display requirements, such as a scene of playing a competition game, a scene of watching a high-definition dynamic video and the like. In the embodiments of the present disclosure, the refresh frequency of the touch display panel is not limited to the first frequency, and may also be set according to different application scenes, so that the use requirements of different application scenes are satisfied. For example, the refresh frequency of the touch display panel may be set as the second frequency according to the specific setting, the second frequency may be lower than the first frequency, for example, when the first frequency is 120 Hz, the second frequency may be 90 Hz or 60 Hz, so that the use requirements of displaying a static picture or other application scenes without requirements for higher refresh frequency may be satisfied, and thus the power consumption of the touch display panel is reduced. Similarly, when the refresh frequency of the touch display panel is reduced, the time of each frame of image display is relatively prolonged, and in this case, the touch and display requirements of a current display refresh frequency may be satisfied without shortening the refresh frequency of the display stage and the touch stage in each display image frame.

In an embodiment, the method for driving the touch display panel may further include: in the touch stage in which the refresh frequency is the second frequency, touch drive signals are sequentially provided for each touch driver electrode column, first voltage signals are provided for each touch driver electrode column, and touch sensing signals returned by each touch sensing electrode are received, respectively; where the first frequency is greater than the second frequency.

Specifically, when the refresh frequency of the touch display panel is a second frequency lower than the first frequency, that is, the refresh frequency of the touch display panel 10 is a relatively low refresh frequency, and in this case, the charging speed of the capacitor does not need to be increased, and the touch drive signal may be provided to the touch driver electrode only through the touch driver circuit, so that the touch auxiliary circuit does not need to provide a first voltage signal, and the charging requirement of the capacitor formed by the touch driver electrode and the touch sensing electrode may be satisfied; therefore, the power consumption of the touch display panel may be relatively reduced, and thus the flexible use requirement of the touch display panel is satisfied.

Based on a same inventive concept, an embodiment of the present disclosure further provides a display device, and the display device includes the touch display panel provided in the embodiments of the present disclosure, so that the display device has the technical features and beneficial effects of the touch display panel provided in the embodiments of the present disclosure; and the same may be referred to the above description of the touch display panel provided in the embodiments of the present disclosure.

Figure 20:
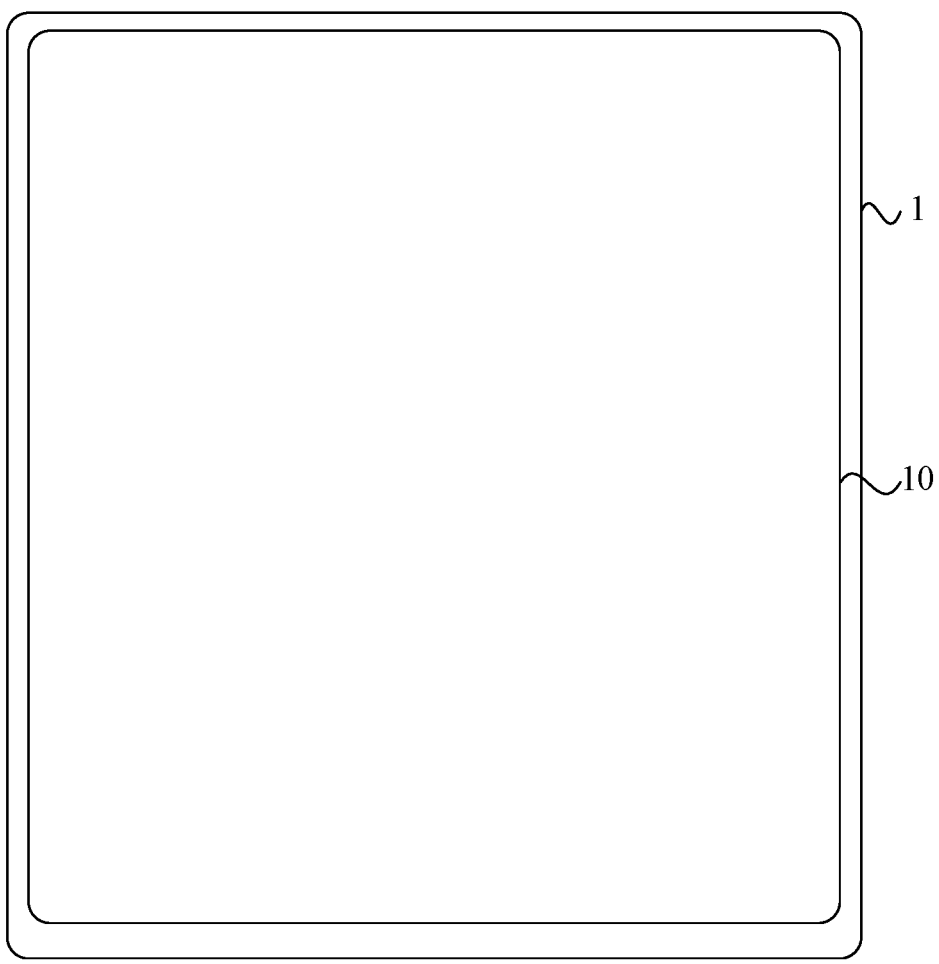
FIG. 20 is a schematic structural diagram of a display device provided in an embodiment of the present disclosure.

In an exemplary embodiment, FIG. 20 is a schematic structural diagram of a display device provided in an embodiment of the present disclosure, as shown in FIG. 20, the display device 1 includes a touch display panel 10, and the specific structure and beneficial effects of the touch display panel 10 have been described in detail in the above embodiments and are not repeated here.

It should be understood that the display device 1 provided in the embodiments of the present disclosure may be any electronic device with display and touch functions, such as a mobile phone, a tablet computer, an electronic book or a television.

It is to be noted that the above-described contents are only the exemplary embodiments of the present disclosure and the technical principles applied thereto. It is to be understood by those skilled in the art that the present disclosure is not limited to the particular embodiments described herein, and that various variations, rearrangements and substitutions may be made without departing from the protection scope of the present disclosure. Therefore, although the present disclosure has been described in detail with reference to the above embodiments, the present disclosure is not limited to the above embodiments, and may further include other equivalent embodiments without departing from the concept of the present disclosure, and the scope of the present disclosure is defined by the appended claims.

What is claimed is:

1. A touch display panel, comprising a display region and a non-display region surrounding the display region; wherein the display region comprises a plurality of touch driver electrodes arranged in array and a plurality of touch sensing electrodes arranged in array; and the non-display region comprises a touch auxiliary circuit and a touch driver circuit; wherein,
   when a refresh frequency is a first frequency, the touch driver circuit is configured to provide a touch drive signal for each touch driver electrode of the plurality of touch driver electrodes in a touch stage, and receive a touch sensing signal returned by each touch sensing electrode of the plurality of touch sensing electrodes so as to determine a touch position according to the touch sensing signal returned by the each touch sensing electrode;
   when the refresh frequency is the first frequency, the touch auxiliary circuit is configured to provide a first voltage signal for the each touch driver electrode in the touch stage; and
   a voltage of the first voltage signal is greater than a voltage of the touch drive signal.

2. The touch display panel of claim 1, wherein,
   when the refresh frequency is a second frequency, the touch driver circuit is configured to provide a touch drive signal for the each touch driver electrode in the touch stage, and receive a touch sensing signal returned by the each touch sensing electrode so as to determine a touch position according to the touch sensing signal;
   when the refresh frequency is the second frequency, the touch auxiliary circuit is configured to stop providing the first voltage signal for the each touch driver electrode; and
   the first frequency is greater than the second frequency.

3. The touch display panel of claim 1, wherein the touch auxiliary circuit comprises a power supply module and a plurality of switch modules; wherein,
   a voltage signal output terminal of the power supply module is electrically connected to an input terminal of each switch module of the plurality of switch modules; and the power supply module is configured to provide the first voltage signal to the input terminal of the each switch module in a touch stage in which the refresh frequency is the first frequency;
   the plurality of touch driver electrodes arranged in array form a plurality of touch driver electrode columns; each touch driver electrode column of the plurality of touch driver electrode columns comprises a plurality of touch driver electrodes sequentially arranged in a first direction; the plurality of switch modules and the plurality of touch driver electrode columns are disposed in an one-to-one correspondence manner; each touch driver electrode belonging to a same touch driver electrode column of the plurality of touch driver electrode columns is electrically connected to an output terminal of a same switch module of the plurality of switch modules; and the plurality of switch modules are configured to transmit the first voltage signal to the plurality of touch driver electrodes in the touch stage in which the refresh frequency is the first frequency.

4. The touch display panel of claim 3, wherein the power supply module comprises a plurality of control signal output terminals and at least one voltage signal output terminal;

the plurality of switch modules form at least one first gating circuit; an input terminal of each switch module of a same first gating circuit of the at least one first gating circuit is electrically connected to a same voltage signal output terminal of the at least one voltage signal output terminal, and a control terminal of each switch module of a same first gating circuit of the at least one first gating circuit is electrically connected to different control signal output terminals of the plurality of control signal output terminals; and the power supply module is configured to provide an enable level of a control signal for a control terminal of each switch module of a same first gating circuit of the at least one first gating circuit at different times in the touch stage in which the refresh frequency is the first frequency, so as to control each switch module of a same first gating circuit of the at least one first gating circuit to be turned on at different times.

5. The touch display panel of claim 3, wherein the touch driver circuit comprises a plurality of control signal output terminals; and the power supply module comprises at least one voltage signal output terminal;

the plurality of switch modules form at least one first gating circuit; an input terminal of each switch module of a same first gating circuit of the at least one first gating circuit is electrically connected to a same voltage signal output terminal of the at least one voltage signal output terminal, and a control terminal of each switch module of a same first gating circuit of the at least one first gating circuit is electrically connected to different control signal output terminals of the plurality of control signal output terminals; and the touch driver circuit is configured to provide an enable level of a control signal for a control terminal of each switch module of a same first gating circuit of the at least one first gating circuit at different times in the touch stage, so as to control each switch module of a same first gating circuit of the at least one first gating circuit to be turned on at different times.

6. The touch display panel of claim 5, wherein the touch driver circuit further comprises a plurality of touch drive signal output terminals and at least one gating control terminal;

the touch display panel further comprises at least one second gating circuit, each second gating circuit of the at least one second gating circuit comprises at least one gating switch; a control terminal of each gating switch of a same second gating circuit of the at least one second gating circuit is electrically connected to different gating control terminals of the at least one gating control terminal, and an input terminal of each gating switch of a same second gating circuit of the at least one second gating circuit is electrically connected to a same touch drive signal output terminal of the plurality of touch drive signal output terminals; and an output terminal of each gating switch is electrically connected to each touch driver electrode belonging to a same touch driver electrode column of the plurality of touch driver electrode columns;

in the touch stage, each gating control terminal of the at least one gating control terminal outputs an enable level of a gating control signal at different times, and each touch drive signal output terminal of the plurality of touch drive signal output terminals outputs the touch drive signal to each touch driver electrode of the each touch driver electrode column; and a gating control terminal of the at least one gating control terminal is multiplexed as a control signal output terminal the plurality of control signal output terminals.

7. The touch display panel of claim 5, wherein the plurality of switch modules forms one of the at least one first gating circuit;

the touch driver circuit further comprises a plurality of touch drive signal output terminals, and the each touch driver electrode belonging to a same touch driver electrode of the plurality of touch driver electrodes are electrically connected to a same touch drive signal output terminal of the plurality of touch drive signal output terminals;

in the touch stage, the each touch drive signal output terminal outputs the touch drive signal to each touch driver electrode of the each touch driver electrode column at different times; and a touch drive signal output terminal of the plurality of touch drive signal output terminals is multiplexed as a control signal output terminal of the plurality of control signal output terminals.

8. The touch display panel of claim 7, wherein the non-display region further comprises a plurality of touch drive signal transmission lines;

each touch driver electrode belonging to a same touch driver electrode column of the plurality of touch driver electrode columns is electrically connected to a same touch drive signal output terminal of the plurality of touch drive signal output terminals through a same touch drive signal transmission line of the plurality of touch drive signal transmission lines; and control terminals of the plurality of switch modules are electrically connected to the plurality of touch drive signal output terminals in a one-to-one correspondence manner through the plurality of touch drive signal transmission lines.

9. The touch display panel of claim 3, wherein the power supply module and the touch driver circuit are integrated in a same touch driver chip.

10. The touch display panel of claim 3, the display region further comprising a plurality of display units arranged in array; and the non-display region further comprises a display driver circuit;

wherein the display driver circuit is configured to provide a display signal for each display unit of the plurality of display units in a display stage so as to control the each display unit to display; and wherein the power supply module and the display driver circuit are integrated in a same display driver chip.

11. The touch display panel of claim 10, wherein the display driver circuit comprises a plurality of control signal output terminals; and the power supply module comprises at least one voltage signal output terminal;

the plurality of switch modules form at least one first gating circuit; an input terminal of each switch module of the plurality of switch modules and of a same first gating circuit of the at least one first gating circuit is electrically connected to a same voltage signal output terminal of the at least one voltage signal output terminal, and a control terminal of the each switch module of a same first gating circuit of the at least one first gating circuit is electrically connected to different control signal output terminals of the plurality of control signal output terminals; and the display driver circuit is further configured to provide an enable level of a control signal for a control terminal of the each switch module of a same first gating circuit of the at least one first gating circuit at different times in the touch stage, so as to control the each switch module of a same first gating circuit of the at least one first gating circuit to be turned on at different times.

12. The touch display panel of claim 3, the each switch module comprises a first transistor; wherein a gate of the first transistor is a control terminal of the each switch module, a first electrode of the first transistor is an input terminal of the each switch module, and a second electrode of the first transistor is an output terminal of the each switch module.

13. The touch display panel of claim 12, the display region further comprises a display unit; and the display unit comprises a second transistor;

wherein the first transistor comprises a first active layer, a first gate, the first electrode and the second electrode; and the second transistor comprises a second active layer, a second gate, a third electrode and a fourth electrode;

the touch display panel further comprises a base substrate; wherein the first active layer and the second active layer are disposed on a side of the base substrate and are disposed on a same layer; the first gate and the second gate are disposed on a side of the base substrate and are disposed on a same layer; and the first electrode, the second electrode, the third electrode and the fourth electrode are disposed on a side of the base substrate and are disposed on a same layer.

14. A method for driving a touch display panel, comprising:

in a touch stage in which a refresh frequency is a first frequency, providing a touch drive signal and a first voltage signal for each touch driver electrode column, and receiving a touch sensing signal returned by each touch sensing electrode, respectively; wherein a voltage of the first voltage signal is greater than a voltage of the touch drive signal; and determining a touch position according to the touch sensing signal returned by the each touch sensing electrode.

15. The method for driving a touch display panel of claim 14, further comprising:

in a touch stage in which the refresh frequency is a second frequency, sequentially providing a touch drive signal for the each touch driver electrode column, stopping providing the first voltage signal for the each touch driver electrode column, and receiving the touch sensing signal returned by the each touch sensing electrode, respectively; wherein the first frequency is greater than the second frequency.

16. A display device, comprising a touch display panel, wherein the touch display panel comprises:

a display region and a non-display region surrounding the display region; wherein the display region comprises a plurality of touch driver electrodes arranged in array and a plurality of touch sensing electrodes arranged in array; and the non-display region comprises a touch auxiliary circuit and a touch driver circuit; wherein, when a refresh frequency is a first frequency, the touch driver circuit is configured to provide a touch drive signal for each touch driver electrode of the plurality of touch driver electrodes in a touch stage, and receive a touch sensing signal returned by each touch sensing electrode of the plurality of touch sensing electrodes so as to determine a touch position according to the touch sensing signal returned by the each touch sensing electrode;

when the refresh frequency is the first frequency, the touch auxiliary circuit is configured to provide a first voltage signal for the each touch driver electrode in the touch stage; and a voltage of the first voltage signal is greater than a voltage of the touch drive signal.

17. The display device of claim 16, wherein, when the refresh frequency is a second frequency, the touch driver circuit is configured to provide a touch drive signal for the each touch driver electrode in the touch stage, and receive a touch sensing signal returned by the each touch sensing electrode so as to determine a touch position according to the touch sensing signal;

when the refresh frequency is the second frequency, the touch auxiliary circuit is configured to stop providing the first voltage signal for the each touch driver electrode; and the first frequency is greater than the second frequency.

18. The display device of claim 16, wherein the touch auxiliary circuit comprises a power supply module and a plurality of switch modules; wherein, a voltage signal output terminal of the power supply module is electrically connected to an input terminal of each switch module of the plurality of switch modules; and the power supply module is configured to provide the first voltage signal to the input terminal of the each switch module in a touch stage in which the refresh frequency is the first frequency;

the plurality of touch driver electrodes arranged in array form a plurality of touch driver electrode columns; each touch driver electrode column of the plurality of touch driver electrode columns comprises a plurality of touch driver electrodes sequentially arranged in a first direction; the plurality of switch modules and the plurality of touch driver electrode columns are disposed in an one-to-one correspondence manner; each touch driver electrode belonging to a same touch driver electrode column of the plurality of touch driver electrode columns is electrically connected to an output terminal of a same switch module of the plurality of switch modules; and the plurality of switch modules are configured to transmit the first voltage signal to the plurality of touch driver electrodes in the touch stage in which the refresh frequency is the first frequency.

19. The display device of claim 18, wherein the power supply module comprises a plurality of control signal output terminals and at least one voltage signal output terminal;

the plurality of switch modules form at least one first gating circuit; an input terminal of each switch module of a same first gating circuit of the at least one first gating circuit is electrically connected to a same voltage signal output terminal of the at least one voltage signal output terminal, and a control terminal of each switch module of a same first gating circuit of the at least one first gating circuit is electrically connected to different control signal output terminals of the plurality of control signal output terminals; and the power supply module is configured to provide an enable level of a control signal for a control terminal of each switch module of a same first gating circuit of the at least one first gating circuit at different times in the touch stage in which the refresh frequency is the first frequency, so as to control each switch module of a same first gating circuit of the at least one first gating circuit to be turned on at different times.

20. The display device of claim 18, wherein the touch driver circuit comprises a plurality of control signal output terminals; and the power supply module comprises at least one voltage signal output terminal;

the plurality of switch modules form at least one first gating circuit; an input terminal of each switch module of a same first gating circuit of the at least one first gating circuit is electrically connected to a same voltage signal output terminal of the at least one voltage signal output terminal, and a control terminal of each switch module of a same first gating circuit of the at least one first gating circuit is electrically connected to different control signal output terminals of the plurality of control signal output terminals; and the touch driver circuit is configured to provide an enable level of a control signal for a control terminal of each switch module of a same first gating circuit of the at least one first gating circuit at different times in the touch stage, so as to control each switch module of a same first gating circuit of the at least one first gating circuit to be turned on at different times.

* * * * *